US006681985B1

(12) United States Patent
Curtin et al.

(10) Patent No.: US 6,681,985 B1
(45) Date of Patent: Jan. 27, 2004

(54) SYSTEM FOR PROVIDING ENHANCED SYSTEMS MANAGEMENT, SUCH AS IN BRANCH BANKING

(75) Inventors: Karen Curtin, Bellevue, WA (US); Mark J. Conway, Bellevue, WA (US); Jeffrey C. Link, Maple Valley, WA (US); David W. Nelson, Seattle, WA (US); Ronald A. Turner, North Vancouver (CA); Deanna W. Oppenheimer, Mercer Island, WA (US); Scott A. Smith, Mason, OH (US)

(73) Assignee: Washington Mutual, Inc., Seattle, WA (US)

( * ) Notice: Subject to any disclaimer, the term of this patent is extended or adjusted under 35 U.S.C. 154(b) by 0 days.

(21) Appl. No.: 09/972,754

(22) Filed: Oct. 5, 2001

Related U.S. Application Data
(60) Provisional application No. 60/239,626, filed on Oct. 9, 2000, provisional application No. 60/238,305, filed on Oct. 5, 2000, provisional application No. 60/291,612, filed on May 16, 2001, provisional application No. 60/239,630, filed on Oct. 9, 2000, provisional application No. 60/260,567, filed on Jan. 9, 2001, provisional application No. 60/238,306, filed on Oct. 5, 2000, and provisional application No. 60/291,660, filed on May 16, 2001.

(51) Int. Cl.[7] .............................................. G06F 17/60
(52) U.S. Cl. ........................... 235/379; 705/42; 705/43
(58) Field of Search ................................ 235/379, 380, 235/378; 705/10, 13, 42, 43, 5

(56) References Cited

U.S. PATENT DOCUMENTS

| | | | | |
|---|---|---|---|---|
| 1,242,872 A | | 10/1917 | Saunders | |
| 4,237,799 A | * | 12/1980 | Berman | .......................... 109/2 |
| 4,423,313 A | * | 12/1983 | Tanigaki | ...................... 235/379 |
| 4,461,221 A | * | 7/1984 | Schandle et al. | .............. 109/6 |
| 4,580,040 A | * | 4/1986 | Granzow et al. | ........... 235/379 |
| 4,700,295 A | * | 10/1987 | Katsof et al. | .................. 705/10 |
| 4,818,974 A | * | 4/1989 | Fernandez | ................... 340/574 |
| 4,977,502 A | * | 12/1990 | Baker et al. | ................... 705/13 |
| 5,097,328 A | * | 3/1992 | Boyette | ....................... 348/150 |
| 5,434,394 A | * | 7/1995 | Roach et al. | ................ 235/375 |
| 5,600,114 A | * | 2/1997 | Dunlap et al. | .............. 235/379 |
| 5,787,403 A | * | 7/1998 | Randle | ......................... 705/43 |
| 5,804,804 A | * | 9/1998 | Fukatsu et al. | .............. 235/379 |

(List continued on next page.)

FOREIGN PATENT DOCUMENTS

| | | | | | |
|---|---|---|---|---|---|
| JP | 05274549 A | * | 10/1993 | ............ | G07G/1/06 |
| JP | 08272878 A | * | 10/1996 | ............ | G06F/19/00 |

OTHER PUBLICATIONS

U.S. patent application Ser. No. 09/972,027, Curtin et al., Filed Oct. 5, 2001.
U.S. patent application Ser. No. 09/972,764, Curtin et al., Filed Oct. 5, 2001.
De La Rue Cash Systems GMBH and Plan Object GMBH, "dialog banking in der Praxis," Mörfelden–Walldorf, 18 pages.

(List continued on next page.)

Primary Examiner—Michael G. Lee
Assistant Examiner—Kumiko C. Koyama
(74) Attorney, Agent, or Firm—Perkins Coie LLP

(57) ABSTRACT

Various embodiments of the invention include a financial transactions processing system to process financial transactions for a customer in a financial institution. One embodiment includes an entrance, a concierge desk, two or more teller towers, and a teller cash dispenser. The teller towers may contain a teller computer, a top surface, one or more cash slots, and a cash box. A bank employee at the teller tower performs transactions for a customer, such as depositing cash, performing account inquiries, etc. In one embodiment, the teller cash dispenser receives information regarding a withdrawal transaction and dispenses cash to a customer or the customer receives a printed receipt to receive cash from the cash dispenser. In another embodiment, the teller towers are arranged in a circle, semicircle, elongated circle, or oval.

10 Claims, 28 Drawing Sheets

U.S. PATENT DOCUMENTS

| | | | | |
|---|---|---|---|---|
| 5,971,271 | A | * 10/1999 | Wynn et al. | 235/380 |
| 6,003,019 | A | * 12/1999 | Eaton et al. | 705/42 |
| 6,012,050 | A | * 1/2000 | Eaton et al. | 705/42 |
| 6,073,119 | A | 6/2000 | Bornemisza-Wahr et al. | |
| 6,223,983 | B1 | * 5/2001 | Kjonaas et al. | 235/379 |
| 6,378,770 | B1 | * 4/2002 | Clark et al. | 235/379 |

OTHER PUBLICATIONS

De La Rue Cash Systems Inc., "Impact and Opportunities, Transforming teller operations through innovative automated cash handling solutions." BCS–BROC–BNFT–0104, 2001, Lisle, Illinois, 10 pages.

International Business Machines, Corp., "Visual Banker for e–business—IBM Visual Banker makes Washington Mutual's vision of a 'universal workstation' a reality." Aug. 1998, Toronto, Ontario, 4 pages.

International Business Machines, Corp., "Branch Sales Solution Overview," *Visual Banker Version 4.5—Branch Sales Release Notes*, Mar. 19, 1999, Toronto, Ontario, p. 2.

O'Neil Product Development, Inc., "Introducing . . . The New O'Neil MicroFlash 4t," Irvine, California, 6 pages.

Sklar, Marc, "Washington Mutual brews up new banking concept," Jun. 28, 2000, http://www.dbusiness.com/Story/0,1118,PHX__211120,00.html (Aug. 23, 2000), 2 pages.

Symbol Technologies, Inc., "Spectrum24 High Rate 11Mbps Wireless LAN, Extend the Reach of Your Enterprise Network with IEEE 802.11b Ethernet–Speed Connectivity," Jan. 2000, Holtsville, New York, 6 pages.

Symbol Technologies, Inc., "Spectrum24 High Rate 11Mbps Wireless LAN, Extend the Reach of Your Enterprise Network with IEEE 802.11b Ethernet–Speed Connectivity," May 2000, Holtsville, New York, 6 pages.

Symbol Technologies, Inc., "SPT 1700 and SPT 1700–2D Pocketable Computers," May 2000, Holtsville, New York, 2 pages.

Symbol Technologies, Inc., "Cradles—SPT 1500 and SPT 1700 Series Pocketable Computers," May 2000, Holtsville, New York, 2 pages.

TASC Operations, Inc., Products Brochure, Alpharetta, Georgia, 12 pages.

Washington Mutual—Corporate Training & Development, Visual Banker 4.0 Procedures Manual, Jan. 1998, pp. Cover, 1–33.

Washington Mutual—Corporate Training & Development, Offline Procedures, Jan. 1998, pp. 31–33.

Washington Mutual—Corporate Training & Design, Visual Banker Teller Procedures Manual, Table of Contents, Section 1—The Monetary System, Feb. 1998, pp. i–iii, 1–66.

Washington Mutual—Corporate Training Design, Visual Banker Power User Procedures Manual, Mar. 1998, Table of Contents and pp. 1–26.

Washington Mutual—Corporate Training Design, Visual Banker 4.0 Address/Telephone Changes Procedures Manual, Jun. 1998, Cover and pp. 1–10.

* cited by examiner

SYSTEM FOR PROVIDING ENHANCED SYSTEMS MANAGEMENT, SUCH AS IN BRANCH BANKING

CROSS-REFERENCE TO RELATED APPLICATIONS

This application claims the benefit of U.S. Provisional Patent Applications: No. 60/239,626, filed Oct. 9, 2000, "System and Method of Providing Enhanced Systems Management, Such as in Branch Banking," No. 60/238,305, filed Oct. 5, 2000, "Information Display System and Method," No. 60/291,612, filed May 16, 2001, "System and Method for Providing Enhanced Systems Management, Such as in Branch Banking," No. 60/239,630, filed Oct. 9, 2000, "System and Method for Providing Enhanced Systems Management, Such as in Branch Banking," No. 60/260,567, filed Jan. 9, 2001, "System and Method for Providing Enhanced Systems Management, Such as in Branch Banking," No. 60/238,306, filed Oct. 5, 2000, "Portable Computer, Such As for Use With Financial Services Applications," and "Stationary and Portable Computers, Such as For Use with Financial Services Applications," No. 60/291,660, filed May 16, 2001.

BACKGROUND

The disclosure relates generally to systems management, and more particularly to financial systems management.

Analyzing systems for efficiency is an ongoing task. There are often ways to improve existing systems to make them more profitable, quicker or better. Automation is one example of a way to improve the efficiency of an existing system. One method of automation may be to use computers to perform data sorting tasks that previously had been performed by people.

Financial systems are an example of a system that may benefit from increased efficiencies. A typical branch banking establishment has a teller counter along one wall. The teller counter typically is relatively long and has room for five or more bank tellers to stand behind the counter. The teller counter is usually about waist high or higher for most people. The bank tellers remain behind the teller counter and interact with customers over the teller counter. Often a series of rooms exist behind the teller counter where bank tellers and other employees often go to perform administrative tasks, complete parts of transactions, etc.

Customers often must wait in line to perform typical branch banking functions at a traditional bank. As a result, customers may be hesitant to perform some or all transactions capable of being performed at branch banks. Additionally, customers may be reluctant to investigate all transactions performed by, or offerings of, a branch bank. This is exacerbated by the traffic flow in a traditional branch bank, which directs customers to a teller counter against one wall and discourages movement throughout the branch bank. Some banks have attempted to attract customers by providing flashing audio/visual content, such as described in U.S. Pat. No. 6,073,119.

Moreover, traditional branch banks are often intimidating to their customers and have very formal feels to them. By requiring customers to wait in line to talk to a teller standing behind a long teller counter, traditional branch banks increase the intimidation level of their customers. Traditional branch banks also have a very formal atmosphere, particularly because of the line, teller counter, and the "mysterious" rooms behind the teller counter. The passing back and forth of cash between the customer and teller also increases the formality of the situation.

Bank tellers often are involved in cash transactions with customers of the branch bank. For example, customers will often deposit cash with the bank or receive cash from the bank. Tellers have a cash drawer from which they will add or remove cash as appropriate. At the end of the day, tellers must "cash out" and show that all deposits and withdrawals are reflected in the cash drawer. Penalties may be levied on a teller by the branch bank if the cash drawer does not have the correct amount of cash at the end of the day. This causes additional stress on the tellers, resulting in lower employee happiness and retention. Additionally, this makes it more difficult to find suitable employees, as employees that are capable of handling large sums of cash need to be found.

Another problem with traditional branch banks is that there is a large amount of money in the bank that can be accessed, making the branch bank an inviting target for thieves or bank robbers. Many branch banks have attempted to solve this problem by storing the bulk of valuables (e.g., cash, financial instruments, etc.) in a safe that only a few employees have access to. Another solution is to have a safe that no employees have access to and that can instead only be accessed by an after-hours security service. These solutions, however, still result in a large amount of cash being available in teller drawers, keeping the branch bank an attractive target. In addition, safety precautions such as a large safe, reinforced teller counters, and other precautions add significantly to the cost of a branch bank.

Bank tellers perform a wide variety of tasks in their role with the branch bank. These tasks include performing account inquiries, depositing money or checks, withdrawing money from a customer's account, providing traveler's checks, answering questions, etc. Most of the tasks performed by a bank teller require the use of a bank teller computer located at the teller counter. The bank teller computer is connected via a network to a server computer that provides access to customer accounts and other necessary information. Using the bank teller computers, customer accounts may be accessed and customers served. Bank teller computers usually use a somewhat large area of the teller counter (for the keyboard, pointing device, monitor, etc.), limiting the number of tellers that may use a teller counter at one time.

However, the time necessary to perform the transactions can vary greatly. Because customers often must wait in line to perform typical branch banking functions, many customers have to wait for a long time to have a quick and easy service performed, such as depositing a check or performing an account inquiry. Waiting in a long line to perform a transaction that takes a few seconds is very inefficient. Long waits may also put customers in a bad mood, discourage them from visiting the bank, or cause them to use a different bank altogether.

As noted above, bank tellers at traditional branch banks use bank teller computers located at the teller counter to perform transactions and service customers. Data is often input to computers or processors using a variety of input devices, including manual input devices. Typical manual computer input devices include keyboards or keypads, mice, trackballs, joysticks, and the like. Data may also be input to computers using a variety of automated techniques, such as optical and magnetic. Magnetic input devices include magnetic card swipe readers that read, for example, magnetic stripes on most credit and debit cards.

Some computers employ optical input systems. One rapid method of inputting data into a computer employs reading bar codes or other optically (or magnetically) readable characters. An optical input system such as an LED pen or laser scanner provides information to a processor in a computer, where the processor in turn decodes the bar codes into appropriate data characters. Other magnetic input devices include Magnetic Ink Character Recognition (MICR) input devices that may read the bank checks printed with magnetic ink.

Laser scanners in point-of-sale terminals are specifically designed to rapidly decode bar code symbols (particularly UPC symbols) on products. Point-of-sale terminals are terminals where retail and other items are purchased. Such laser scanner point-of-sale terminals can read only bar code symbols, and typically only bar code symbols selected from a preprogrammed symbology. A separate device at the point-of-sale takes credit or debit card information (such as a magnetic card reader), while another device receives the manual input and performs computations, such as a cash register.

Such separate devices are costly in the aggregate for any facility. Further, interfaces may be necessary for the separate devices to communication with each other or with a separate, remote computer. Moreover, these devices are often bulky and limited to fixed point applications. While such systems improve efficiencies of tasks performed by tellers and others, there is still a need to provide improved efficiencies and improve customer service.

Overall, there is a need for a branch banking system that solves the above problems while supplying the above benefits, as well as providing other advantages.

Figure 1:
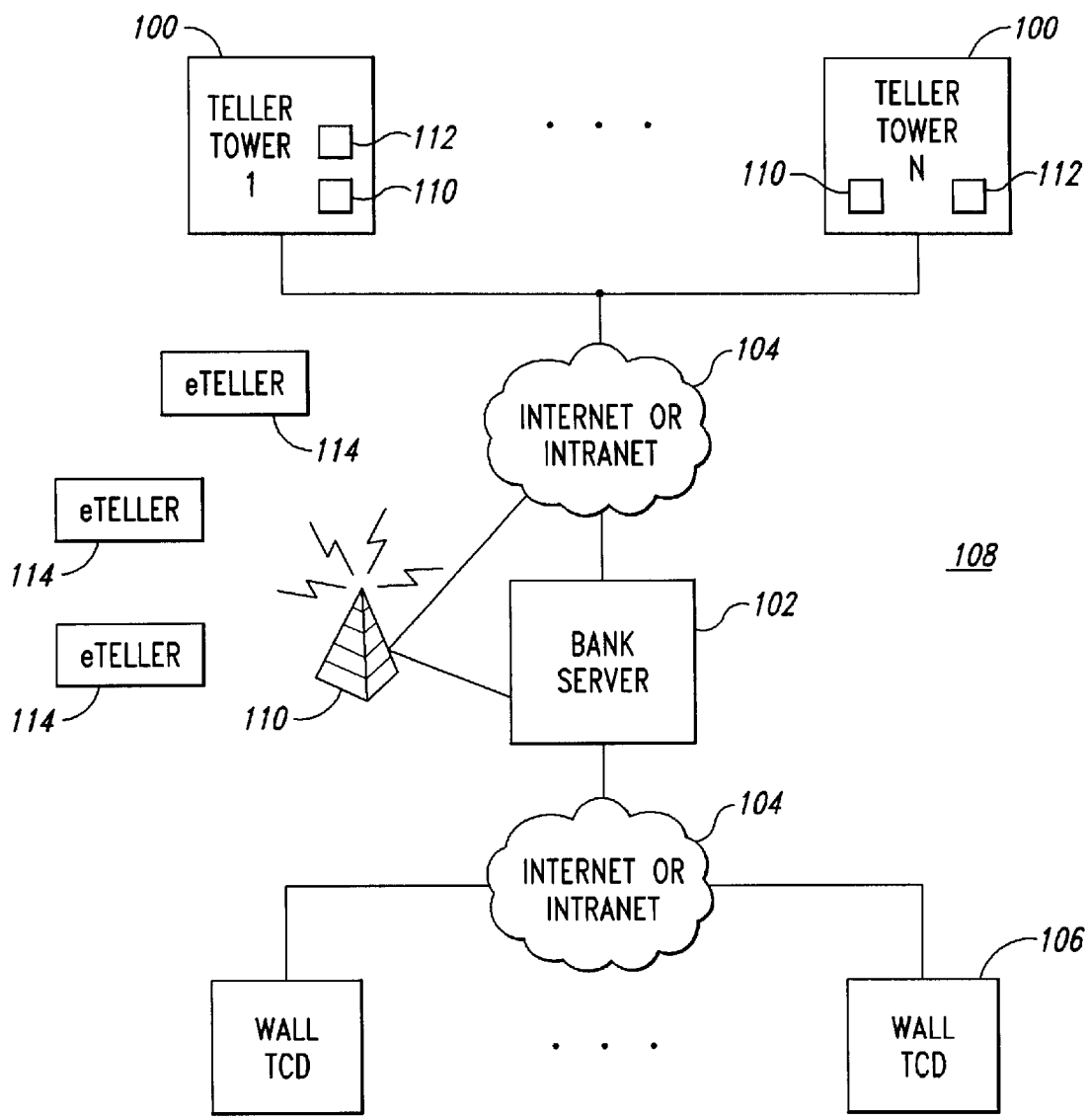
FIG. 1 is a block diagram illustrating a teller tower and a bank server used to implement the teller tower system in one embodiment.

In the drawings, the same reference numbers identify identical or substantially similar elements or acts. To easily identify the discussion of any particular element or act, the most significant digit or digits in a reference number refer to the Figure number in which that element is first introduced (e.g., element 202 is first introduced and discussed with respect to FIG. 2).

A portion of this disclosure contains material to which a claim for copyright is made. The copyright owner has no objection to the facsimile reproduction by anyone of the patent disclosure (including Figures), or any patent document that may issue thereon, as it appears in the Patent and Trademark Office patent file or records, but reserves all other copyright rights whatsoever.

Note: the headings provided herein are for convenience and do not necessarily affect the scope or interpretation of the invention.

DETAILED DESCRIPTION

Embodiments of the invention, described below, provide a system of providing enhanced systems management, such as in branch banking. In one embodiment, a branch bank includes two or more teller towers located near the center of the branch bank. Each teller tower may include a cash box, which allows cash to be deposited into a secure box that, along with a teller cash dispenser (TCD), eliminates the need for cash drawers for tellers. TCDs may be located at the teller towers or may be located in another location in the bank. Customers may withdraw cash from the TCD after providing the proper authorization, such as a password, receipt with bar code, or other authorization method.

Retail areas and product focals are located around the teller towers. The branch bank is designed to encourage an open feeling and to direct traffic flow towards the teller towers and the retail areas and product focals. A concierge desk may be located near a high-volume entrance to provide a positive first impression for the customer, to deter theft/ loss, and to direct traffic flow.

The components of the branch bank create a welcoming and inviting environment for a customer because of the open nature of the design, which is in sharp contrast to traditional branch banks. The design of the branch bank, particularly the placement of the teller towers and concierge desk, serve to direct customers to the teller towers, retail areas, and product focals, increasing the chance that a customer will purchase a different product and also providing an improved customer experience. Because bank employees do not have cash drawers, employee happiness, productivity, loss prevention, and branch bank security are improved.

A systems management method, and in particular, a systems management method for financial transactions is described in detail below. In the following description, numerous specific details are set forth, such as specific hardware components, alternative embodiments or options, etc., to provide a thorough understanding of aspects of the invention. One skilled in the relevant art will readily recognize that the invention can be practiced without one or more of the specific details, or with other components, options, etc. In other instances, well-known structures or operations are not shown or described in detail to avoid obscuring aspects of the invention.

Rather than entering a market by acquiring a locally-owned bank, a financial institution may open new branches to thereby establish a competitive presence within the new market. The branches encourage customers to employ self-service devices, such as automated teller machines (ATM), touch screen display computers for accessing information, and computer terminals connected to a computer network (such as an Internet or secure wide-area network) to conduct commercial transactions, particularly financial transactions.

Each branch location is selected from commercial-leased real estate, such as storefronts, strip malls, and near busy commercial locations, such as supermarkets. Each branch may employ a circular or oval internal layout, or portions thereof. The layout employs a seamless transition between insured products (such as Certificates of Deposit) and non-insured financial products (e.g., stocks). Rather than employing a long counter with the tellers positioned behind the counter, "teller towers," similar to podiums, are employed. Each teller tower may include a small work surface, a computer terminal for a teller to use, and TCDs. The teller towers also may include a locked cash box for depositing cash received from customers. After receiving cash from a customer, the bank employee may stuff the cash into a slot in a top surface of the tower where it falls into the secured cash box having a combination safe-type door. After the close of business each day, another person (e.g., an outside vendor, a bank employee, etc.) may then collect the cash in each cash locker and place it in a central safe or other secure location. Bank employees need not "zero out" or "cash out" a cash drawer each day under this embodiment.

When a teller in a traditional branch bank "zero outs" or "cash outs" a cash drawer, all of the transactions of the day are processed and calculated to confirm that the proper amount of cash is located in the cash drawer.

As a result, traditional bank tellers are not employed. Instead, Customer Relationship Representatives (CRRs) handle traditional teller transactions at teller towers (or using "eTellers", described below). They also help customers with other financial needs, including suggesting to the customer additional products offered by the bank. The rank of each CRR is blind to the customers and there is a more seamless transition between job levels or ranks. People hired as CRRs are pre-screened for high sales aptitude to thereby facilitate cross-selling of the bank's various products to customers. Many products may be sold at the teller towers themselves. Employees for new branch banks are selected both from inside the financial institution and from the community. For example, when a new branch bank is to be placed in a new community, the financial institution may contact many minority organizations and conducts a job fair to identify the best candidates in the community to hire. The financial institution begins making community ties with the location at which the branch bank is to be located.

Customer consultation areas are deployed within the layout, with each area including one or more customer consultation desks. The desks are not staffed by employees sitting behind the desk, but are available for a customer to sit and work, and to request assistance from an employee, who may then venture over and join a customer at a desk. Customers may sit down at desks and do work, and then call a CRR over when they need help. Thus, no employee work desks are provided on the publicly accessible bank floor, and desks or work surfaces are instead customer areas. As a result, the bank is transformed into a more retail-like environment. The layout may focus on particular products, such as free checking, consumer loans, home loans, and investments.

A kid's area may include televisions and a play set for children. The televisions may display repeating video information that is not only entertaining but educational to children. For example, such information may discuss the benefits of saving and investing. In a way, the kid's area may serve to generate future customers of the bank.

A concierge, positioned at a concierge station near the entrance, welcomes customers and facilitates them or directs them to areas where they may be able to complete desired financial transactions automatically by using equipment within the branch. The concierge makes eye contact and greets each new customer. The inventors believe that such a personal greeting with each person entering the bank may deter theft.

One or more touch screen displays are positioned within the branch to provide customers with information regarding all financial products, services, and other information they may need with respect to the financial institution. Customers are encouraged to employ self-service features in the bank, such as the ATM machines and touch screen devices.

Employees may employ portable electronic teller machines (eTellers) that replace desktop computers. The electronic teller machines are palm-top computers that may include associated, portable printers. These computers may be either hand-carried or worn by an employee (such as removably secured to a belt or cross-chest strap).

Financial products are made more tangible by productizing them. For example, a "loan-in-a-box" is a physical box with associated marketing and merchandising information on the exterior, and with the interior containing information packets, necessary forms, and, where applicable, computer software. Other financial instruments are similarly packaged within boxes.

Also available are consumer products related to the financial area. Such consumer products may include: financial magazines; financial software; books related to personal finance, investing, and the like; merchandise branded with the bank's logo or name; piggy banks; toys; and, related products (e.g., coin-collecting hobby materials, cards with cash slots, or other finance related merchandise). The layout of the retail section emphasizes three categories: today's dollars, tomorrow's dollars, and kids and money.

FIG. 1 is a block diagram illustrating a teller tower and a bank server used to implement the teller tower system in one embodiment. The teller tower system 108 includes one or more teller towers 100 interconnected to a bank server 102 via a computer network 104, such as the Internet or an intranet. Each teller tower 100 may contain a teller computer 110, which allows a CRR to perform administrative, banking, and customer-support functions from the teller tower 100. The teller computer 110 is able to interact with the bank server 102 via the computer network 104. The teller computer 110 may use Visual Banker 4 from IBM or any other teller software. The teller tower 100 may also include a TCD 112, which distributes cash to a customer from the teller tower 100. A TCD 112 will dispense cash, including both paper and coin currency, once it receives a proper signal or other authorization. The TCD 112 will contain a supply of cash for distribution, but generally does not have the capability to receive cash from a customer. TCDs 112 are known in the art and are available from manufacturers such as De La Rue plc of Hampshire, England, which sells the "TCD 2000," Model 50, and Model 30, among other models, Diebold, Siemens, etc. TCDs 112 may be modified so that they are optimized for delivery of cash to customers instead of bank employees (e.g., changing the bill presentment, etc.). The TCD 112 is able to interact with the bank server 102 via the computer network 104.

The bank server 102 may also be interconnected to one or more wall teller cash dispensers 106 (wall TCDs) via a computer network 104, all of which are part of the teller tower system 108. The wall TCDs 106 may be used to dispense cash to customers from a wall station upon receiving commands or authorization from the bank server 102, similarly to part of the function of an ATM. For example, a CRR with an eTeller 114 could provide a receipt with an authorization number to a customer, who would then use the authorization number to receive cash from a wall TCD 106. Alternatively, the teller towers could omit the TCDs 112, and instead rely on the wall TCD 106.

The bank server 102 may also be interconnected to one or more eTellers 114 via a computer network 104 and/or a wireless base station or receiver/transceiver 110. The wireless base station or repeater/transceiver 110 facilitates wireless communication between the bank server 102 and the eTellers 114, such as portable financial data processing platforms. Wireless base stations and repeater/transceivers use one or more antennas to transmit and receive wireless communications with and from the eTellers 114, and may have either a wired or wireless connection with the bank server 102 or computer network 104.

The eTellers 114, or portable financial data processing platforms, are used by bank employees to provide many of the traditional teller functions from a portable, wireless device. In this embodiment, software on the eTeller 114 provides an interface for the user, such as a CRR, to interact with the bank server 102. By utilizing this interface, the user may perform a wide variety of transactions for customers, such as accepting deposits, distributing funds, accepting checks, transferring money between accounts, making payments on loans, performing account inquiries, etc. These transactions can be performed via a hand-held, wireless platform that can be utilized only when needed and when and where it will provide the most benefit to bank customers, and transactions may be posted in real time.

One advantage of the eTeller 114 is that it is more efficient and more inexpensive than providing additional traditional teller capacity. Because the eTeller 114 performs many of the same functions as a traditional teller computer, many customers can be served with the eTeller 114 instead of the traditional teller computer. This will shorten the lines at traditional teller computers, increase the enjoyment of the customer, and allow customers with relatively easy demands to be serviced quickly and efficiently. Moreover, the branch bank can be designed with the eTellers 114 in mind, allowing for less floor space (and thus less cost) being dedicated to traditional teller computers and teller counters. Instead, eTellers 114 may be brought out at peak times to support traditional teller computers and tellers during such times.

The eTeller 114 also improves the customer experience by removing some of the formality inherent in traditional banks. Instead of bank tellers standing behind a long, formal teller counter, CRRs may wander throughout the bank and service customers anywhere in the bank. This allows CRRs and customers to have more relaxed interactions, increasing customer happiness and also increasing the chance of cross-selling of other products by the bank (e.g., other financial products, financial books, etc.). The eTeller 114 is described in more detail in U.S. patent application Ser. No. 09/972,027, "Portable Computer, Such as for Use With Financial Services Applications, and Software for Such Portable Computer," filed Oct. 5, 2001.

The computers may include a central processing unit, memory, input devices (e.g., keyboard and pointing devices), output devices (e.g., display devices), and storage devices (e.g., disk drives). The memory and storage devices are computer-readable media that may contain instructions to implement the teller tower system 108. In addition, the data structures and message structures may be stored or transmitted via a data transmission medium, such a signal on a communications link. Various communications channels other than the Internet or an intranet may be used, such as a local area network, a wide area network, a point-to-point dial-up connection, or a wireless connection, such as 3G, IEEE 802.11, Bluetooth, or other wireless protocol-based connections.

Figure 2:
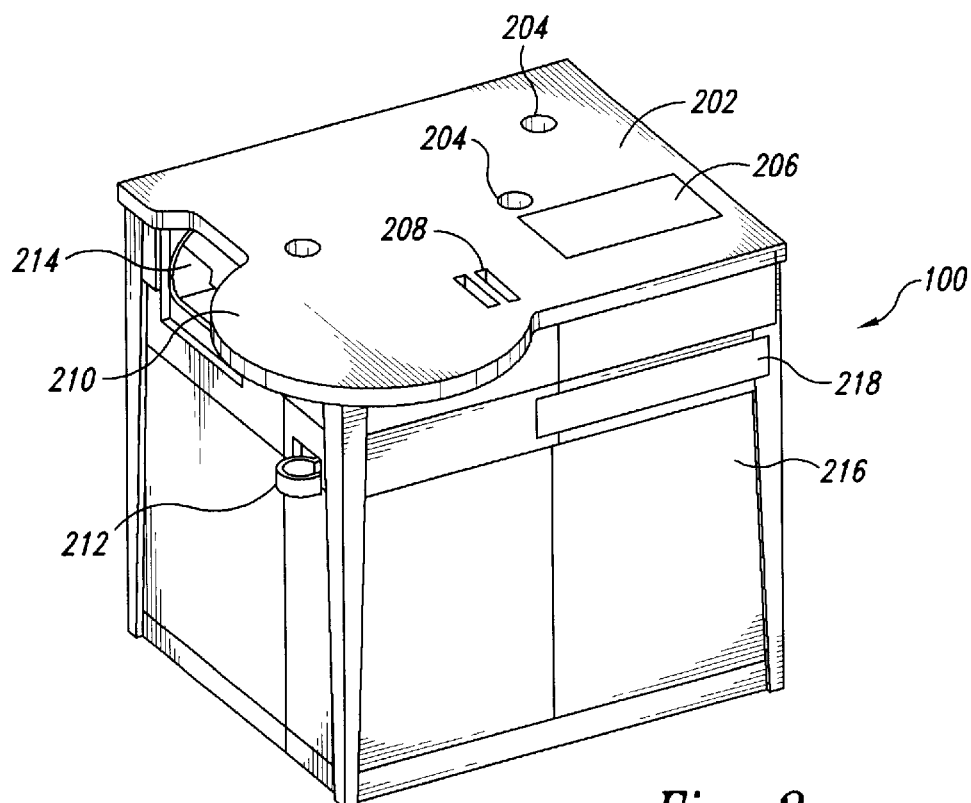
FIG. 2 is a schematic cut-away side view of a teller tower in one embodiment.
Figure 3:
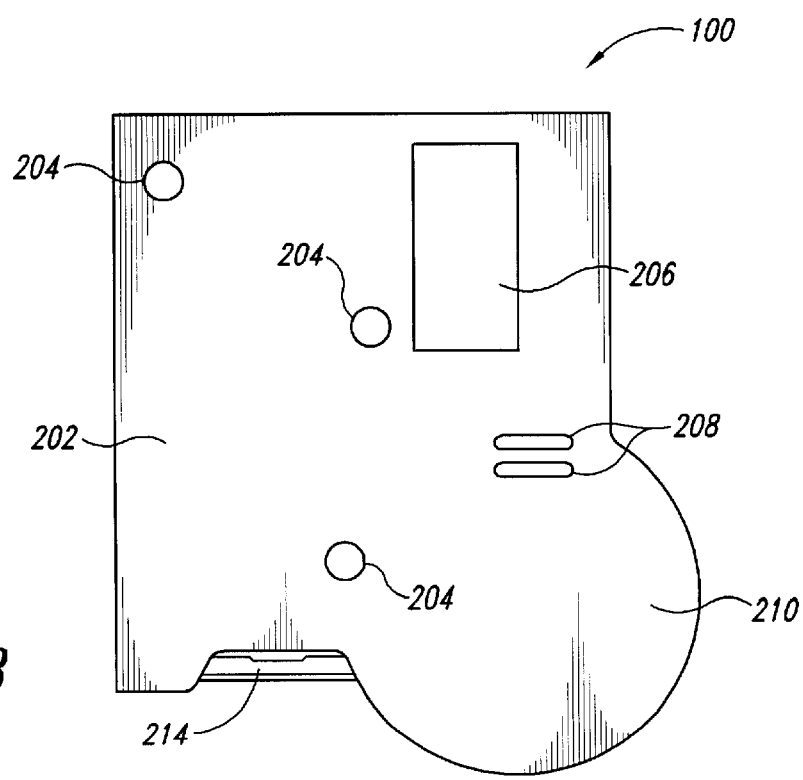
FIG. 3 is a schematic top view of the teller tower of FIG. 2.

FIGS. 2 and 3 illustrate a teller tower 100 in one embodiment. FIG. 2 is an isometric view of a teller tower 100 in one embodiment, while FIG. 3 is a top view of the teller tower 100 of FIG. 2. The teller tower 100 includes an internal teller computer 110 (not shown), which allows a CRR to perform administrative, banking, and customer-support functions via a connection with the bank server 102. The teller computer 110 is connected to a recessed flatscreen monitor 206, which, in the depicted embodiment, lies flush with the top surface 202 of the teller tower 100. Alternatively, any computer display may be provided, such as an inset CRT viewable from the portion 206. A keyboard tray 218 may be located in a side 216 to store a keyboard or other control for use with the teller computer 110. The teller tower 100 may also include an internal TCD 112 (not shown), which distributes cash directly to a customer from the teller tower 100. The sides 216 of the teller tower 100 provide support for the top surface 202 and a customer interaction area 210 and serves to enclose the interior of the teller tower 100. The top surface 202 may include one or more holes or grommets 204, which allow passage of wires, cables, etc. from the top of the teller tower 100 to the interior of the teller tower 100. The customer interaction area 210 is located on one corner of the teller tower 100 and located adjacent or contiguous to the top surface 202. The CRR and customer can use the customer interaction area 210 as a work surface or divider. In a typical use, a CRR would stand on one side of the customer interaction area 210 and the customer would stand 90 to 180 degrees from the CRR on the opposite side of the customer interaction area 210, allowing the CRR and customer could converse over the customer interaction area 210. The CRR and customer could also use the customer interaction area 210 to pass or store documents, hold a drink, etc. By utilizing a customer interaction area 210 instead of a traditional teller counter, the teller tower 100 provides a more open and inviting experience for the customer, and provides more freedom for the CRR to move about with the customer or to provide assistance by moving towards the customer. By not necessarily being at opposite sides of a counter or table, such as at a 90 degree orientation, the CRR and customer are in a more cooperative orientation.

The top surface 202 may also include one or more cash slots 208. Cash slots 208 are one or more holes in the top of the teller tower 100 that allow a teller or customer to stuff cash (either bills or coins) into the holes so that they will fall into the teller tower 100. In one embodiment, the cash will drop into a secured cash box (not shown) after dropping through the cash slots 208. The cash box is described in more detail in U.S. patent application Ser. No. 09/972,764, "System for Providing Enhanced Systems Management, Including Teller Towers and Associated Structures for a Branch Bank," filed Oct. 5, 2001. Because money coming in is dropped into a cash box, and because money going out is distributed out of the TCD 112, each CRR need not have access to cash or have a cash drawer. Instead, an outside security company (e.g., armored car personnel) can come and retrieve the money once the bank is closed. Because of this, the money does not have to be counted at the end of the day and the CRRs may work until very close to their departure time, since resolving the cash issues usually takes longer at the end of the day than other tasks. Moreover, loss prevention is improved, since it is harder for CRRs to either steal money or to make costly mistakes. There are other benefits of handling cash this way. For example, traditional banks expend great sums of money providing large safes and reinforced (e.g., under-counter steel) teller counters. Teller towers 100 with a cash box and a TCD 112 are less expensive than providing those security measures and also take up less space, requiring less square footage for the branch bank (and thus lower monthly costs).

A cash dispensation area 214 is located in the side 408 substantially adjacent the internal TCD 112. After cash has been dispensed by the TCD 112, a customer may collect his or her cash from the cash dispensation area 214. In another alternative embodiment, a TCD 112 is not used at the teller tower 100 at all, and the customer is instead simply given a receipt with a code (e.g., a bar code, alphanumeric code, etc.) that allows them to access another TCD, such as a wall TCD 106, to receive their cash. The teller tower 100 also includes a coin dispenser 212 located within the teller tower 100, with a customer accessible bowl extending outwardly. Similarly to the TCD 112, the coin dispenser 212 dispenses coin currency directly to the customer when necessary. In the depicted embodiment, the cash slots 208 are located on the CRR side and the cash dispensation area 214 and the coin dispenser 212 are located on the customer side. The teller towers 100 may be left or right teller towers 100 depending on where they are placed, as the appropriate teller tower 100 should be used so that CRRs are facing customers as they enter the bank.

One skilled in the art will recognize that many embodiments of the teller towers 100 are possible and within the scope of the invention. Teller towers 100 are described in more detail in U.S. patent application Ser. No. 09/972,764, "System for Providing Enhanced Systems Management, including Teller Towers and Associated Structures for a Branch Bank," filed Oct. 5, 2001.

FIGS. 4–10 are overhead views of layouts of branch banks that incorporate teller towers 100. As will be described in more detail below, the branch bank layouts allows the teller towers 100, in combination with other features of the branch bank (e.g., concierge desk, general floorplan, etc.), to result in a more desirable banking environment for the customer by creating a particular mood or atmosphere, directing traffic in certain directions, etc.

Figure 4:
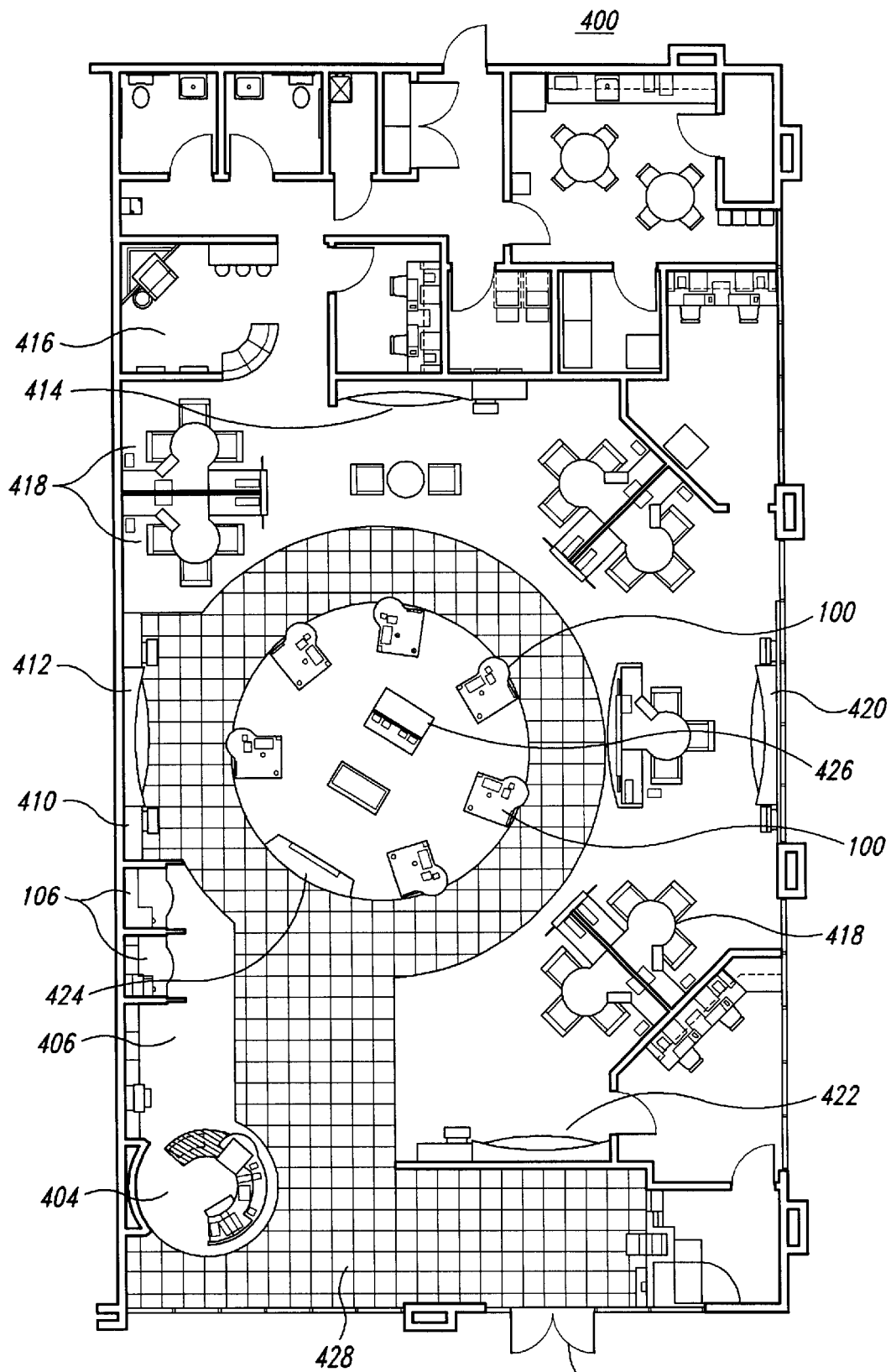
FIG. 4 is an overhead view of a layout of a branch bank in one embodiment.

FIG. 4 is an overhead view of a layout of a branch bank 400 in one embodiment. Customers enter the branch bank 400 through an entrance 402. In the depicted embodiment, a vestibule 428 is located just inside the entrance 402. Customers must walk through the vestibule 428 in order to gain access to the main portion of the branch bank 400. A concierge desk 404 is located near the entrance 402 so that the concierge may greet and converse with customers entering the bank. Along one wall is a retail area 406, wall TCDs 106, and an Internet terminal 410. The retail area 406 includes different retail financial products, such as financial books, branded merchandise, financial software, financial related gifts (e.g., piggy banks, cards with money slots, etc). The wall TCDs 106 allow customers to receive cash upon entry of a code. The code may be received from a CRR (including a CRR with an eTeller 114) and entered manually by the customer. In another embodiment, the wall TCD 106 will read a card or receipt with a bar code to authorize a cash dispensation. The Internet terminal 410 includes an Internet connection to the bank's web site so that financial information, financial instructions, and other services may be provided.

The branch bank 400 includes six (6) teller towers 100 arranged about a circle near the center of the bank. A check writing ledge 424 is also located within the circumference of the circle, and a teller back counter 426 is located near the center of the circle. A customer may use the check writing ledge 424 as a writing surface, and the check writing ledge 424 may also contain writing utensils, blank deposit or withdrawal slips, required regulatory disclosures, etc. The teller back counter 426 can serve almost any purpose, including providing informational brochures, being used as a writing surface, etc., as well as providing centralized functions for CRRs, such as printing capability, storage, etc. The teller back counter 426 may also contain a telephone, cash advance equipment, a printer, devices or items shared by CRRs, etc.

In the depicted embodiment, the teller towers 100 are arranged roughly in a circle with the customer side facing outwards. The customer side of the teller tower 100 is the side where cash is dispensed. A circular configuration allows customers to walk through the circle to either the counter 426 or through to another teller tower 100. This provides a much more open feeling than a traditional teller counter, which keeps all of the tellers behind the counter and severely restricts the places that a customer can go. When a customer is at the counter 426, for example, he or she will be directly behind some of the CRRs, creating a more interactive environment. The circle design also allows other parts of the bank, such as the focals, to be distributed around the teller towers 100 to make those parts more convenient and to increase the chance that a customer will access them, either intentionally or while wandering in the bank. In one embodiment, a six tower circle would have a 10' 2" radius, and an eight tower circle would have a 11' 4" radius. Larger branches would require more than eight towers, in which case the circular shape would be stretched into an elongated circle. Smaller branches, on the other hand, may not have sufficient clearance for a full ring, and those branches could instead have a half-circle with four towers. Left and right-hand versions of the teller towers 100 may be used so that they can be positioned to prevent bank employees from turning their back on customers as they enter the branch bank.

The branch bank 400 also includes a number of "product focals" spread throughout the bank, including a checking focal 412, a home loans focal 414, a financial services focal 420, and a personal loans focal 422. "Product focals" are sections of the branch bank dedicated to a particular product area or concept. Each product focal may have informational brochures, computer-based information systems, blank forms, productized financial products (e.g., "loan in a box"), computer software, financial books, etc., all directed to the subject of the focal. For example, a personal loan focal may have information brochures on the bank's different personal loan options, personal loan application forms, "loan in a box" products, books advocating personal savings and debt reduction, etc. The product focals are typically spread throughout the bank generally near the edges of the bank, so that customers wandering around can go from product focal to product focal. The product focals also are generally placed around the teller towers 100, which also facilitates the ability for customers to wander freely throughout the bank from product focal to product focal or from a product focal to a teller tower 100 or other part of the bank. Product focals are described in more detail in relation to FIGS. 30–32.

The branch bank 400 includes a number of customer consultation platforms 418 and a kid's area 416. The customer consultation platforms 418 are located around the central area of the bank and provide an area for a customer to sit and work. The customer consultation platforms 418 are not staffed by a bank employee (e.g., a CRR), but a customer may request assistance and a bank employee will come over to provide assistance, creating a more retail-like environment. The kid's area 416 provides a variety of entertainment (e.g., television, play set, etc.) and educational options (e.g., educational videos, children's financial books, etc.).

The materials used in the branch banks may be chosen to create a modern, yet warm and comfortable, environment for customers. For example, warm colors such as dark honey wood fixtures with silver detailing may form the bulk of the larger structures, while dark purples, tans, and golden yellows may be used in furniture and floor coverings to create the desired effect. The modern yet warm feel can be achieved through a combination of woods and metal detailing. Warm lighting may also be used throughout the bank, with fully adjustable track lighting being strategically placed to assist traffic flow by spotlighting important display areas on the perimeter as well as walkways. One skilled in the art will recognize, however, that many alternatives for building materials and colors are possible and within the scope of the invention.

Figure 5:
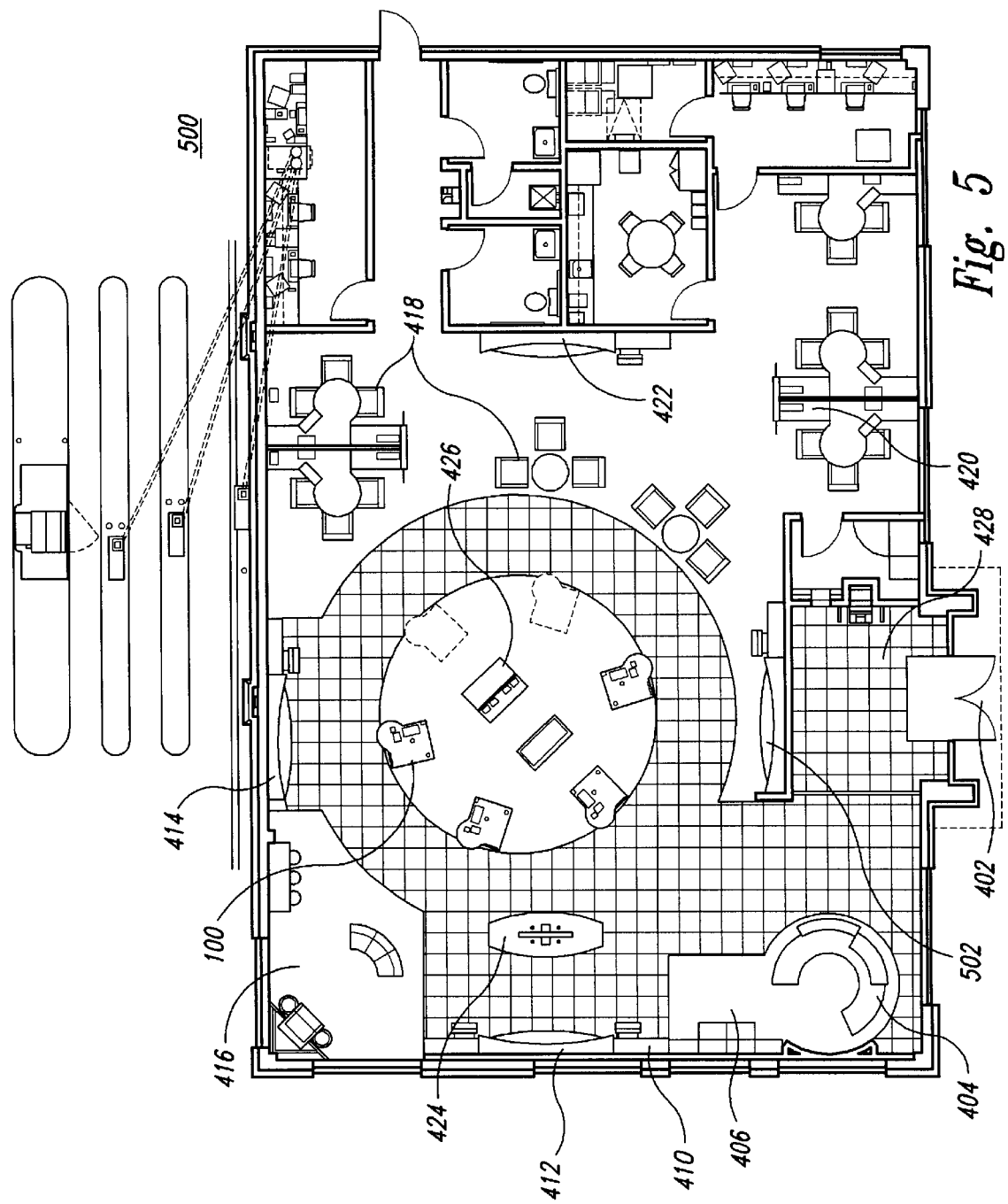
FIG. 5 is an overhead view of a layout of a branch bank in a first alternative embodiment.

FIG. 5 is an overhead view of a layout of a branch bank 500 in a first alternative embodiment. The branch bank 500, and other alternatives described below, is similar in many ways to the branch bank 400 and includes many of the same components. Accordingly, the descriptions of branch bank 500 and other alternatives below will focus on differences with other branch bank designs. The branch bank 500 includes a concierge desk 404 near the entrance 402 of the branch bank, and the hallway design brings all entering customers close to the concierge desk 404. The teller towers 100 are arranged in a circular pattern, but the circle is not "complete" as there are only four (4) teller towers 100. This allows more flexibility to add new teller towers 100 later if business at the branch bank increases. Accordingly, wiring and other connections may be provided so that new teller towers 100 may be quickly and easily installed. The circle of teller towers 100 also does not have a checking ledge in the circumference of the circle, relying instead on a teller back counter 426 and a check writing ledge 424 located closer to the edge of the bank. The branch bank 500 also includes an investment focal 502, which provides information on a variety of investing options.

Figure 6:
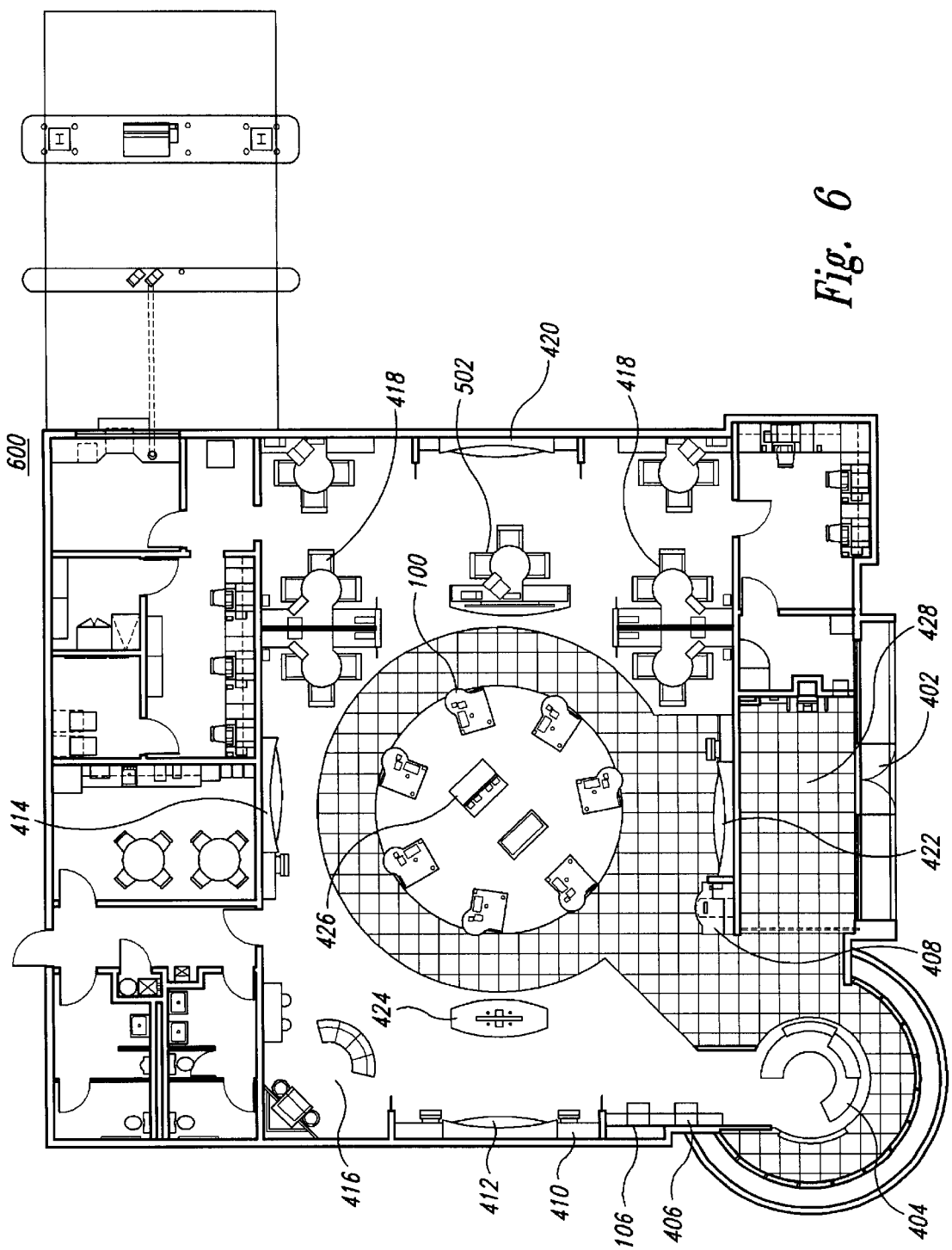
FIG. 6 is an overhead view of a layout of a branch bank in a second alternative embodiment.

FIG. 6 is an overhead view of a layout of a branch bank 600 in a second alternative embodiment. Branch bank 600 includes a complete circle of seven (7) teller towers 100 located roughly in the center of the bank. Branch bank 600 has a roughly square design, and the concierge desk 404 is located in a corner that is more out of the way but is an aesthetically-pleasing circular area with many windows. However, customers entering through the vestibule 428 will still pass near the concierge desk 428.

Figure 7:
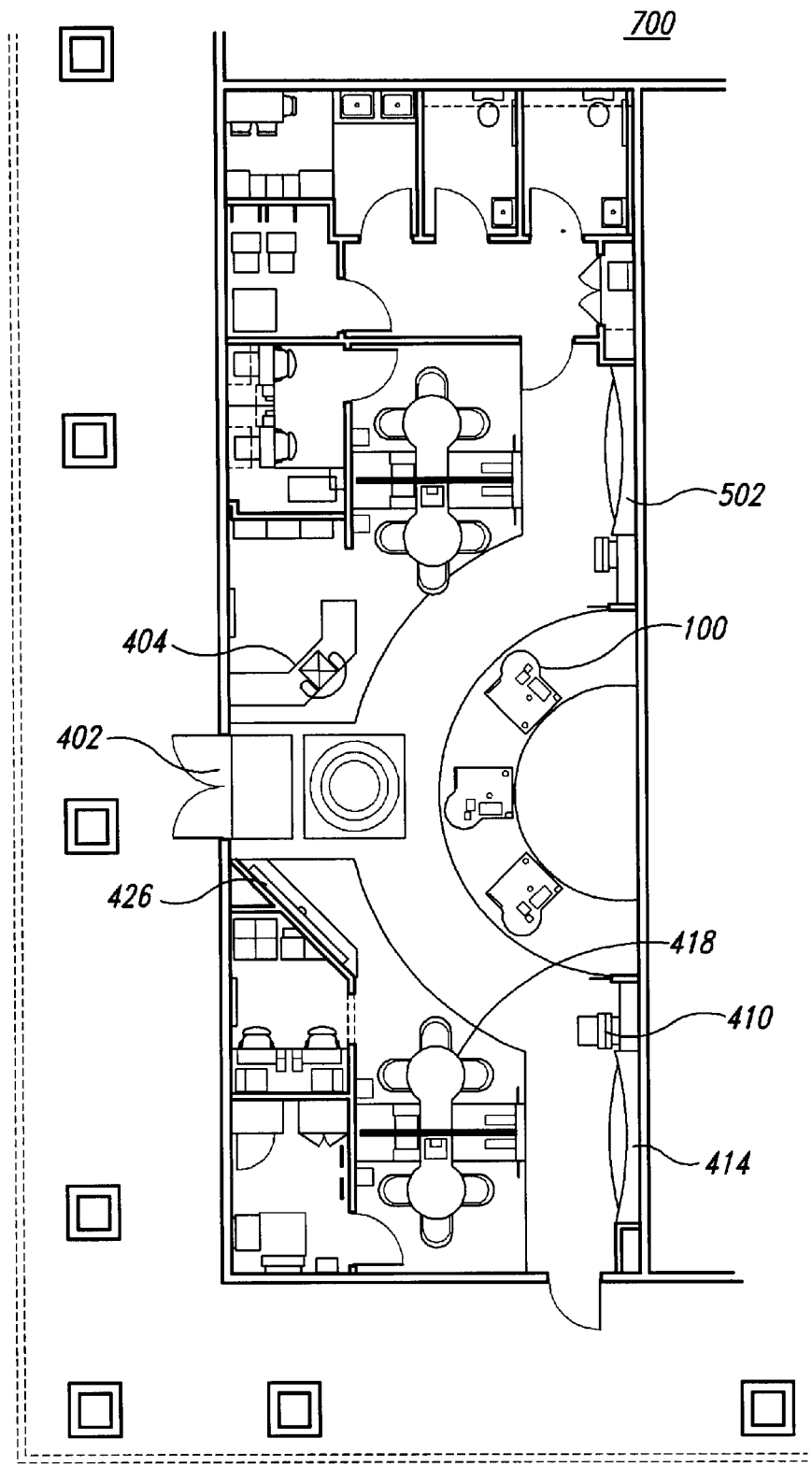
FIG. 7 is an overhead view of a layout of a branch bank in a third alternative embodiment.

FIG. 7 is an overhead view of a layout of a branch bank 700 in a third alternative embodiment. Branch bank 700 is a much more narrow design that is roughly rectangular, with an entrance 402 along one of the longer walls. Directly in front of the entrance along the far wall is a semi-circle of three (3) teller towers 100. The semi-circle design is advantageous when space is too limited for a full circle of teller towers 100, such as might occur in a retrofit of an existing branch bank or new construction in a narrow space. A smaller concierge desk 404 is also used.

Figure 8:
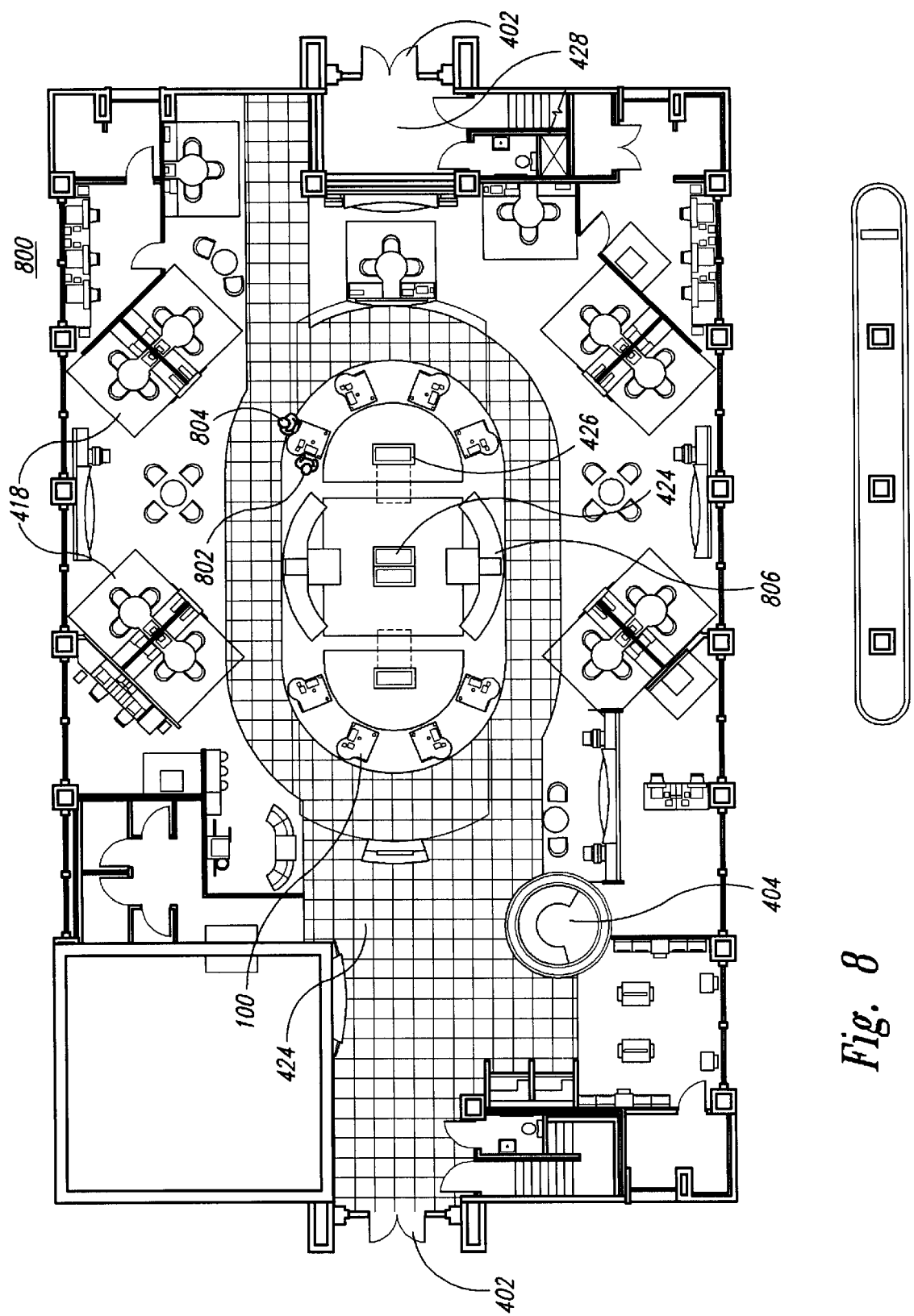
FIG. 8 is an overhead view of a layout of a branch bank in a fourth alternative embodiment.
Figure 9:
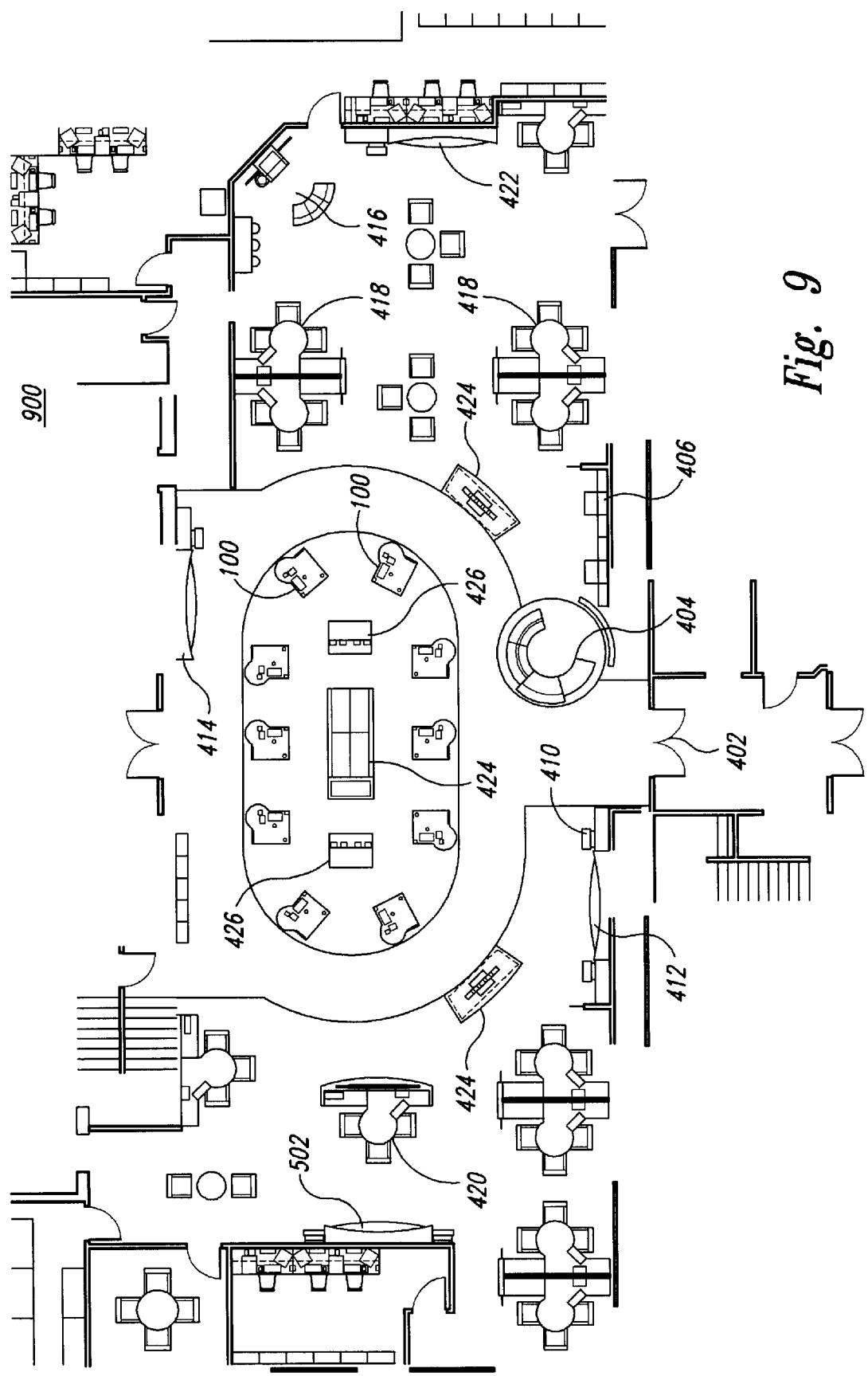
FIG. 9 is an overhead view of a layout of a branch bank in a fifth alternative embodiment.
Figure 10:
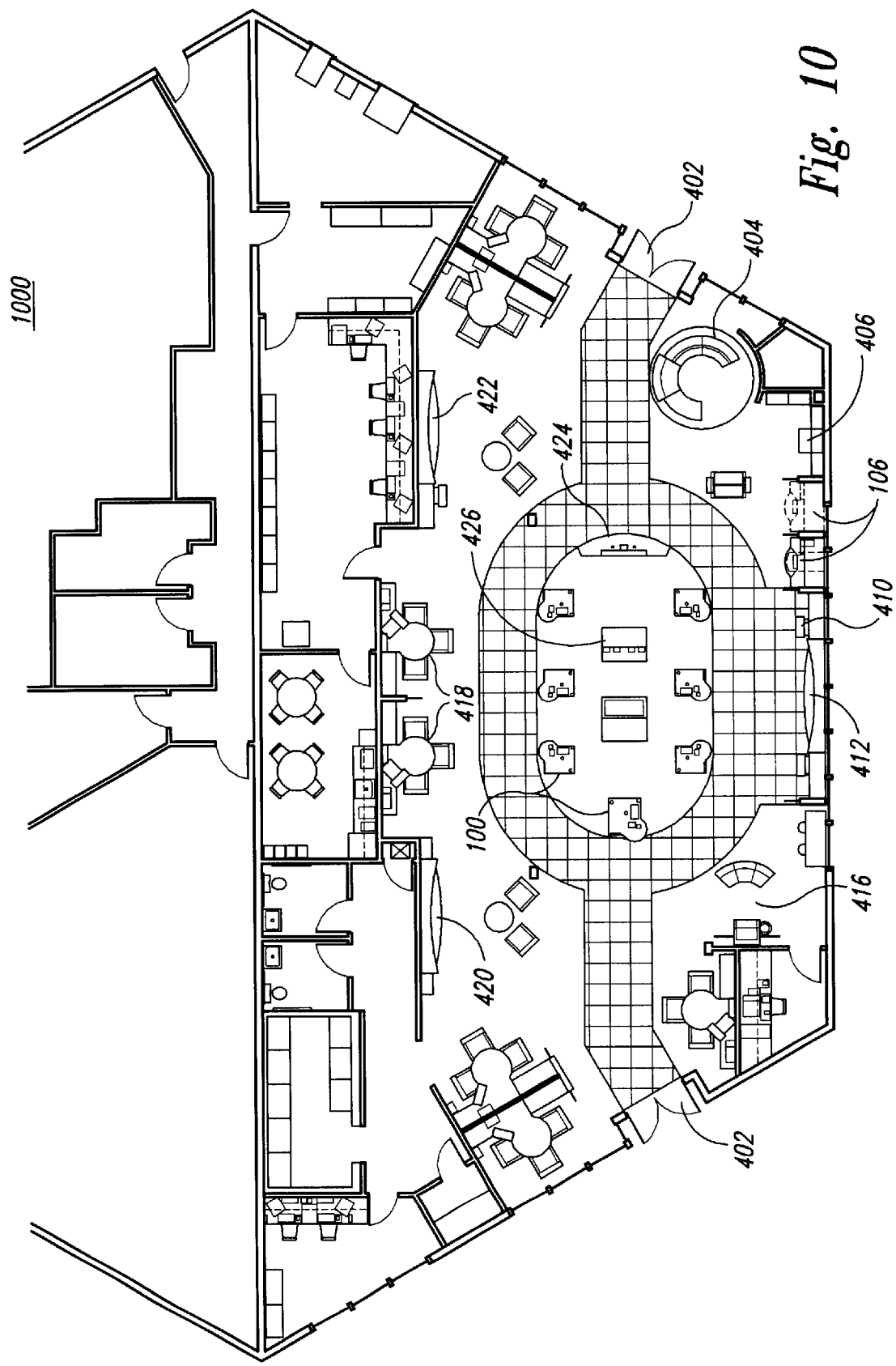
FIG. 10 is an overhead view of a layout of a branch bank in a sixth alternative embodiment.

FIGS. 8–10 depict branch bank embodiments designed for branch banks with large numbers of customers. FIG. 8 is an overhead view of a layout of a branch bank in a fourth alternative embodiment. Branch bank 800 includes two entrances 402 directly opposite each other in a roughly rectangular design, one of the entrances 402 being adjacent a vestibule 428. The concierge desk 404 is near one of the entrances, although another similar desk could located at the other entrance. A roughly oval or elongated circle (a rectangle with two semi-circular areas on the ends) group of teller towers 100 is located near the center of the bank. Three (3) teller back counters 426 are located inside the oval shape. On the long sides of the oval, small teller counters 806 are located. These open, small teller counters 806 include a location for two CRRs and can be a modified version of the teller tower 100 designed to accommodate two CRRs (and thus two customers). The small teller counters 806 provide many of the advantages of teller towers 100 (e.g., openness, etc.) but may provide efficiencies in cost and space. The teller counters 806 are described in more detail in relation to FIG. 26. Branch bank 800 also includes a check writing ledge 424 outside of the oval of teller towers 100. By using a rough oval design, a large number of teller towers 100 can be fit within a relatively narrow space.

FIG. 9 is an overhead view of a layout of a branch bank in a fifth alternative embodiment. Branch bank 900 again includes a rough oval of ten (10) teller towers 100, with teller back counters 426 and a check writing ledge 424 located within the oval. This design provides a large number of teller towers 100 in a relatively narrow space. Check writing ledges 424 are provided outside the oval.

FIG. 10 is an overhead view of a layout of a branch bank in a sixth alternative embodiment. Branch bank 1000 again includes a rough oval of seven (7) teller towers 100 between two entrances 402. The oval includes a check writing ledge 424 in place of one or more teller towers 100, and also includes a teller back counter 426 within the oval.

Figure 11:
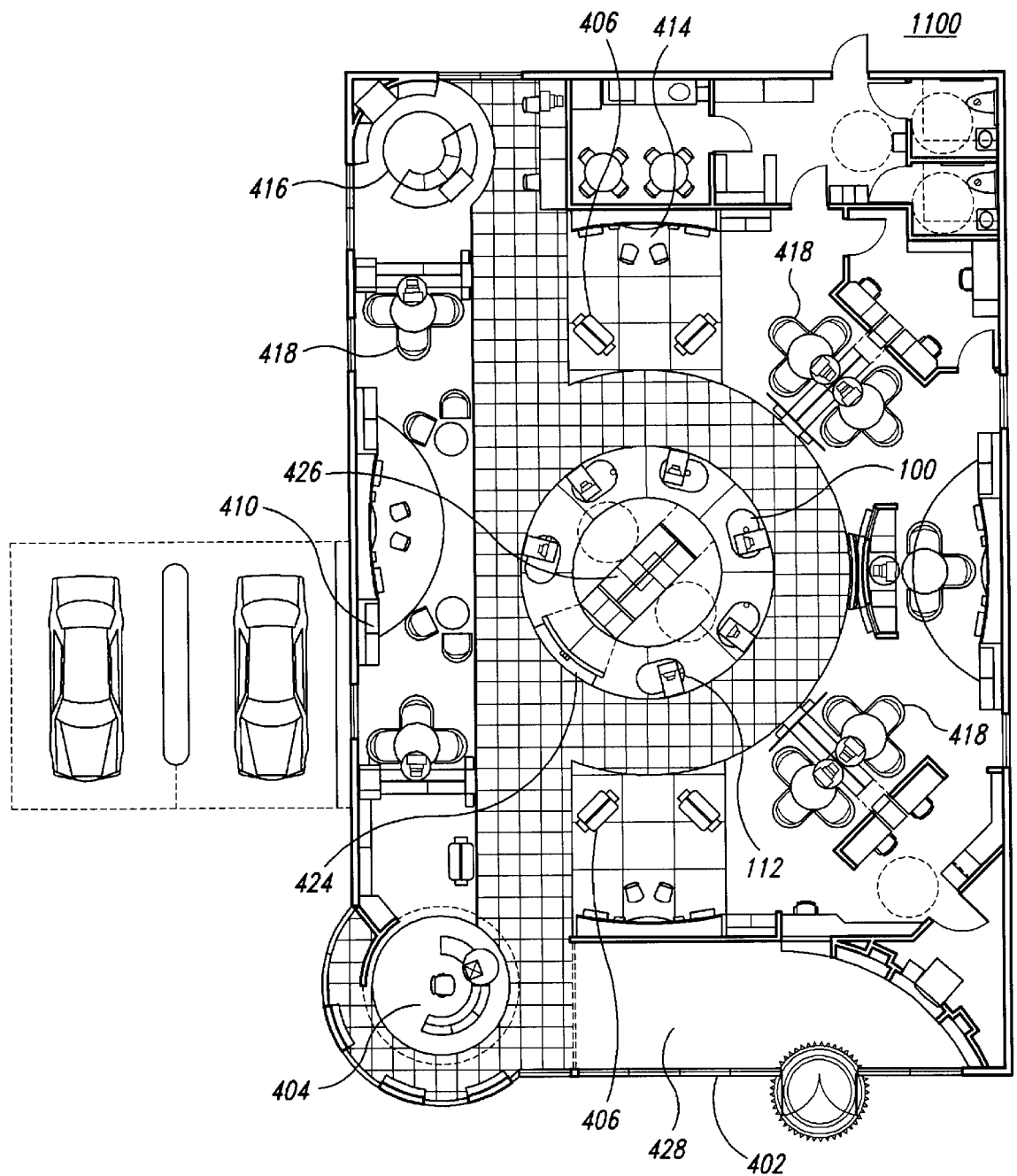
FIG. 11 is an overhead view of a layout of a branch bank in a seventh alternative embodiment.

FIG. 11 is an overhead view of a layout of a branch bank in a seventh alternative embodiment. Branch bank 1000 includes a circle of six (7) teller towers 100 located in a position near the center of the facility. A customer would walk through the vestibule 428, be directed by the concierge desk 404, and come upon the teller towers 100. In the depicted embodiment, each teller tower 100 also has a TCD 112, which dispenses cash to customers standing outside the circle of teller towers 100.

Figure 12:
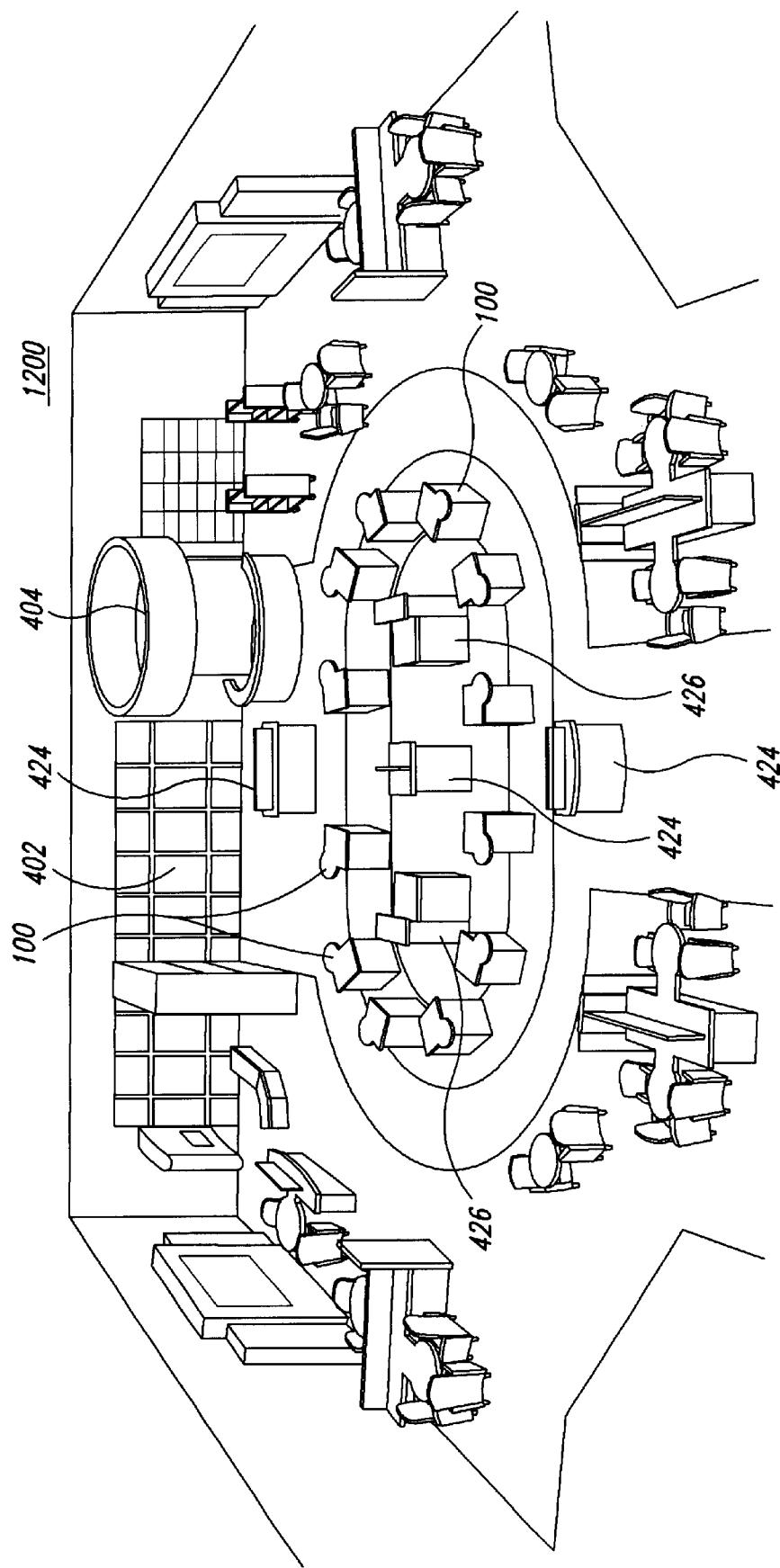
FIG. 12 is an upper side view of a branch bank in an eighth alternative embodiment.

FIG. 12 is an upper side perspective view of a branch bank in an eighth alternative embodiment. Branch bank 1200 includes a rough oval of twelve (12) teller towers 100 located in a position near the center of the facility. Within the oval are two teller back counters 426 and a check writing ledge 424. A concierge desk 404 is located at the entrance 402, and a check writing ledge 424 is placed near the entrance 402. When a customer walks past the check writing ledge 424, he or she is naturally directed to one side of the oval of teller towers 100. Product focals, consultation areas, etc. surround the oval.

Figure 13:
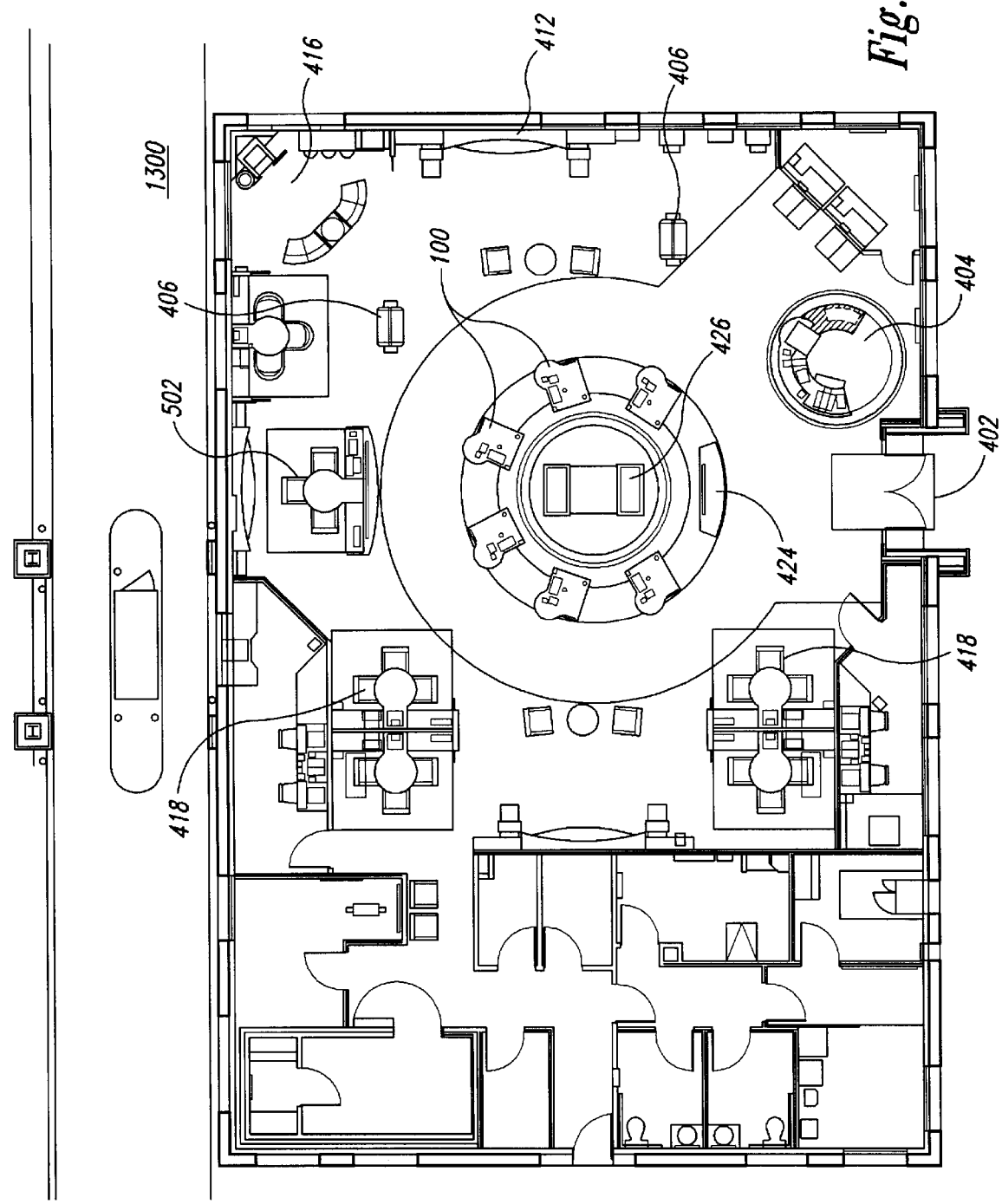
FIG. 13 is an overhead view of a layout of a branch bank in a ninth alternative embodiment.

FIG. 13 is an overhead view of a layout of a branch bank 1300 in a ninth alternative embodiment. Branch bank 1300 includes a circular configuration of teller towers 100 with a check writing ledge 424 in the circumference of the circle. A customer walking in the entrance 402 will pass the concierge desk 404 before reaching the teller towers 100.

Figure 14:
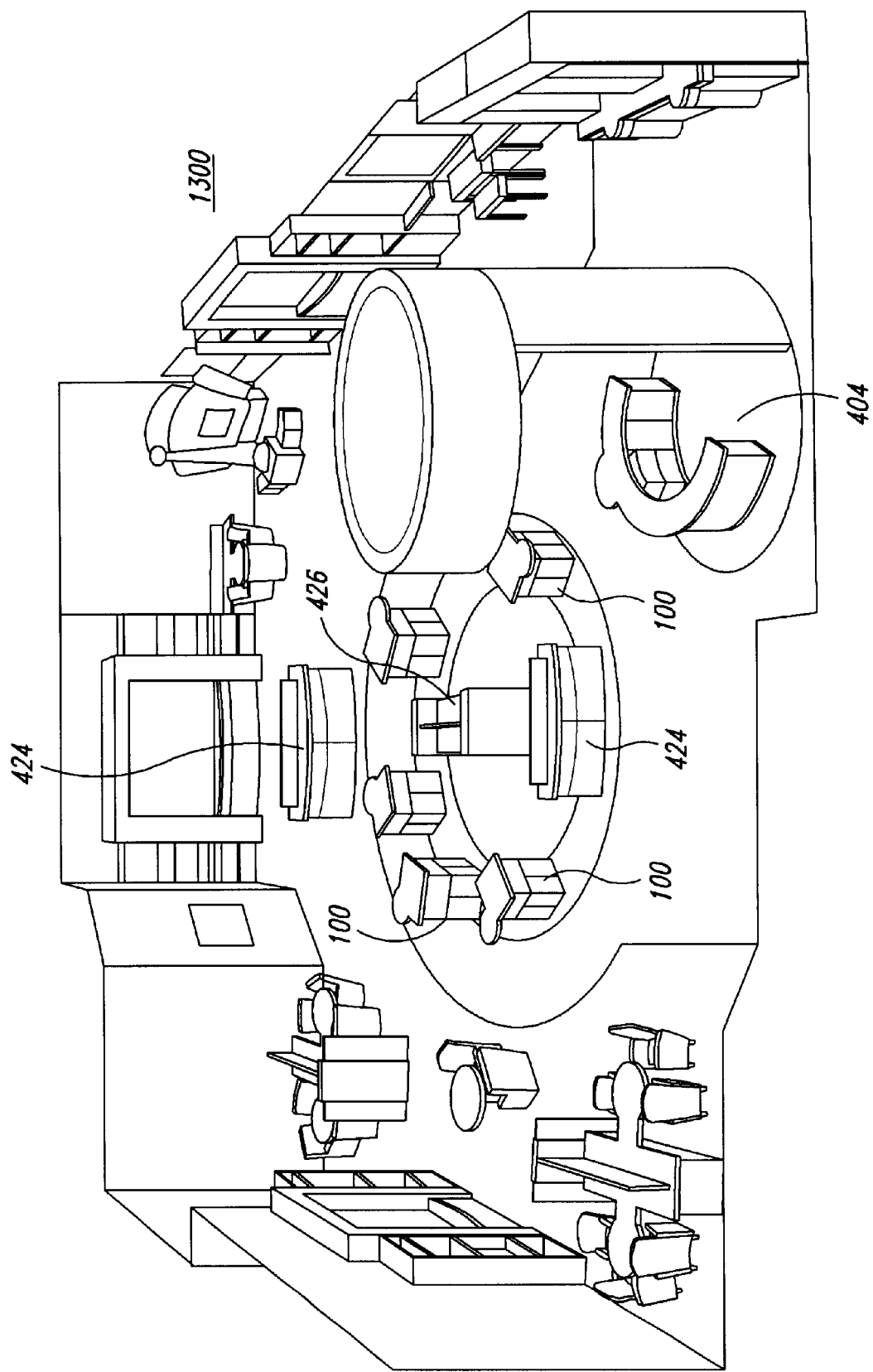
FIG. 14 is a perspective view of the branch bank of FIG. 13.

FIG. 14 is a perspective view of the branch bank 1300 of FIG. 13. Branch bank 1300 includes a circle of six (6) teller towers 100 (one is hidden behind the concierge 404 from this viewing angle) located in a position near the center of the facility. Within the oval is a teller back counter 426 located at the center of the circle and a check writing ledge 424 in the circumference of the circle. Another check writing ledge 424 is located outside the circle.

Figure 15:
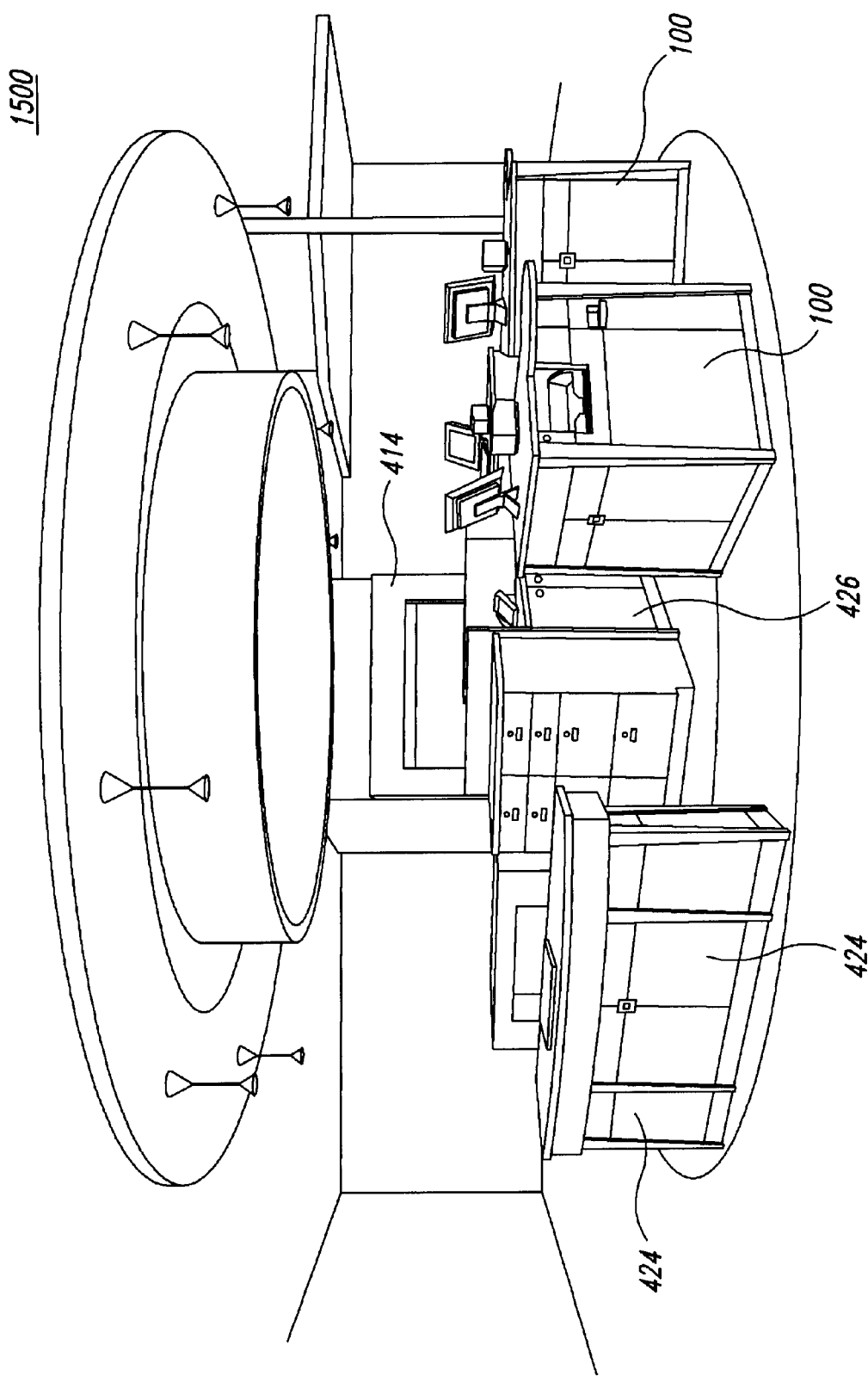
FIG. 15 is side view of a photograph of a branch bank in a tenth alternative embodiment.
Figure 16:
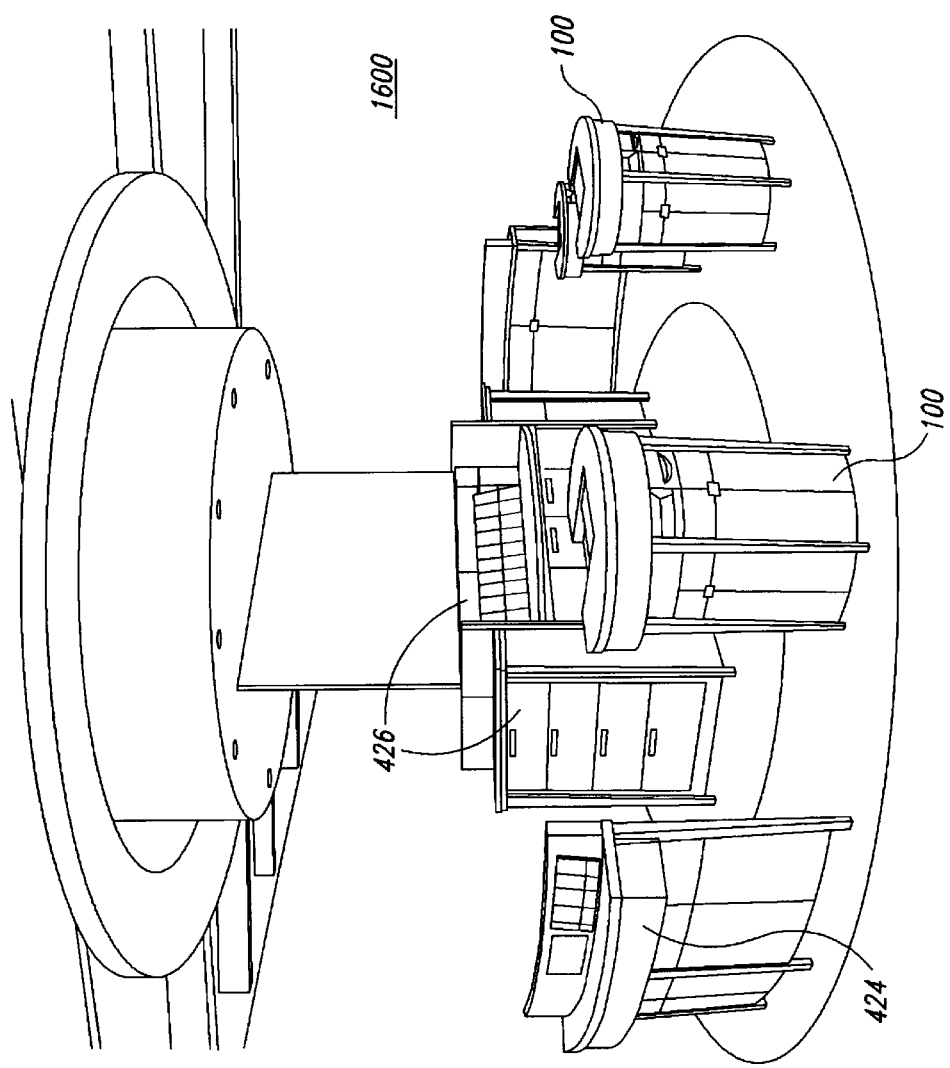
FIG. 16 is a side view of a branch bank in an eleventh alternative embodiment.

FIG. 15 is side view of a photograph of a branch bank in a tenth alternative embodiment. Branch bank 1500 includes a circle teller towers 100. Branch bank 1500 also includes a teller back counter 426 and a check writing ledge 424. FIG. 16 is a side view of a branch bank in an eleventh alternative embodiment. Branch bank 1600 is very similar to that of branch bank 1500, except that the teller towers 100, teller back counter 426, check writing ledge 424, etc., are of slightly different designs.

The branch banks described in the previous Figures are intended to create a general feeling of openness that stands in contrast to traditional banks that are stuff and formal. Moreover, the branch banks are designed to encourage particular patterns of traffic flow—such as directing customers past the concierge, towards the teller towers 100, near retail areas 404 and focals, etc. By doing this, the customer experience is made more positive and the chances of making retails sales, cross-selling, etc. are maximized.

Figure 17:
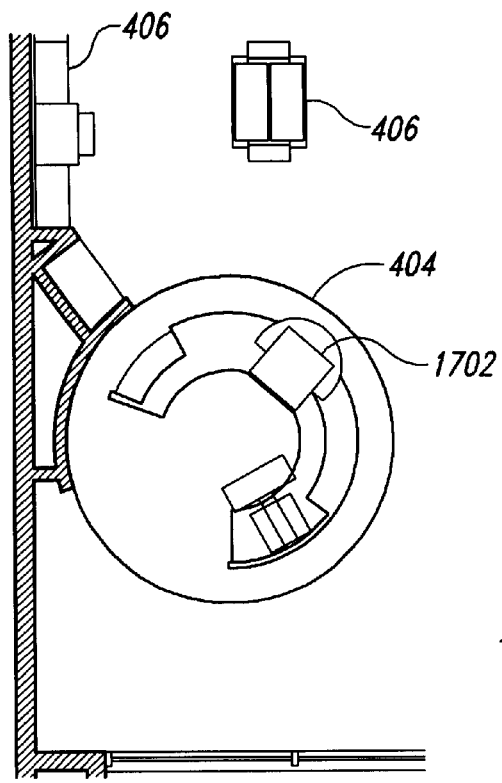
FIG. 17 is an overhead view of a concierge desk in a branch bank in one embodiment.

FIGS. 17–22 depict different views and designs for the concierge desk 404. FIG. 17 is an overhead view of a concierge desk 404 in a branch bank in one embodiment. In the depicted embodiment, the concierge desk 404 is a semi-circular design, with approximately two hundred and forty (240) degrees of arc length. A concierge could stand at the center of the circle. A point of sale (POS) terminal 1702 is located on top of the concierge desk 404, so that the concierge can process sales transactions. Additionally, a retail area 406 may be located near the concierge desk 404, for easy access to customers and so that the concierge can attempt to sell these products easily.

The role of the concierge is to provide the initial impression of the branch bank to customers and to direct the customers to the appropriate area to suit their needs. For this reason, the concierge desk 404 may be placed near a high-traffic entrance 402 to maximize its benefit. The concierge desk 404 may also be located near the retail area 406, so that the concierge may sell products easily and also watch over and manage the retail area 406. The concierge desk 404 should be oriented so that the concierge can easily face the entrance and thus see, and be seen by, entering customers.

Figure 18:
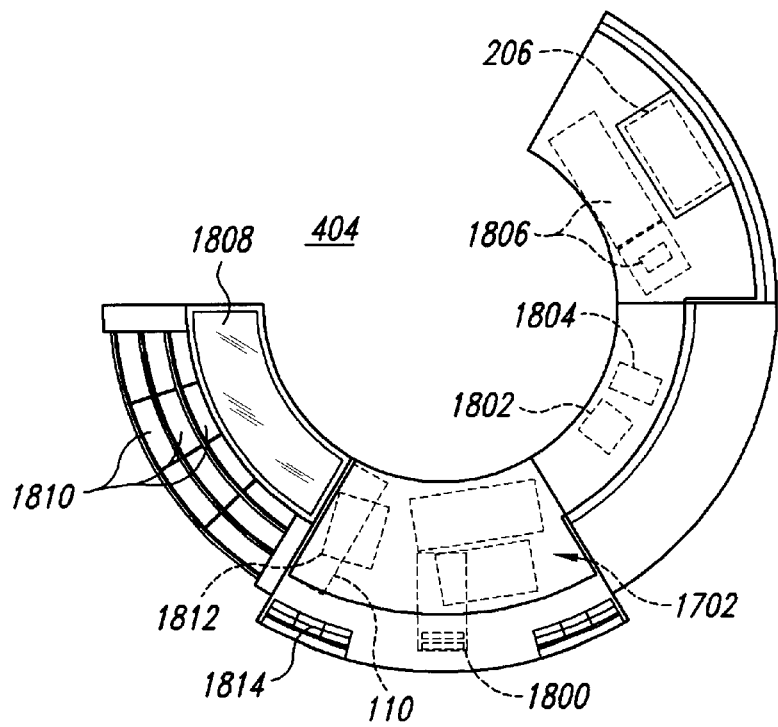
FIG. 18 is a top cut-away view of a concierge desk in a first alternate embodiment.

FIG. 18 is a top cut-away view of a concierge desk 404 in a first alternate embodiment. The concierge desk 404 of FIG. 18, like the one of FIG. 17, is a semi-circular design, with approximately two hundred and forty (240) degrees of arc length, allowing a concierge to stand at the center of the circle. On one end of the concierge desk 404 is located a recessed flatscreen monitor 206 and computer controls 1806, such as a keyboard and mouse, both of which, in conjunction with a teller computer 110, allow a concierge to perform teller transactions. Nearer the center of the concierge desk is a POS terminal 1702, credit card verification machine 1802, personal identification number (PIN) changer 1804, and express deposit box 1800. The express deposit box 1800 allows customers to place deposits in the box in order to save time. In another embodiment, the express deposit box 1800 is used by bank employees to deposit cash or other deposits after a deposit transaction has been recorded on an electronic device, such as an eTeller 114. The credit card verification machine 1802 may be used to test a customer's credit card, process credit card transactions, identify a customer, etc. The PIN changer 1804 is used by a concierge to change the PIN number of a customer, either by entry of the new PIN by the customer or the concierge. The concierge desk 404 also includes a telephone switch board 1812, which allows a concierge to perform receptionist duties such as providing an initial screening of phone calls, transferring calls, etc.

The concierge desk 404 of FIG. 18 also includes brochure pockets 1814, tiered bins 1810, and a showcase 1808. These components provide advertising and marketing capability to the concierge desk 404. For example, the brochure pockets 1814 and tiered bins 1810 may contain advertising brochures, informational brochures or other materials, etc., all of which improve the customer experience and increase the potential of cross-selling of other bank products. The showcase 1808 may provide a similar function, as it may contain larger advertising, posters, etc.

Figure 19:
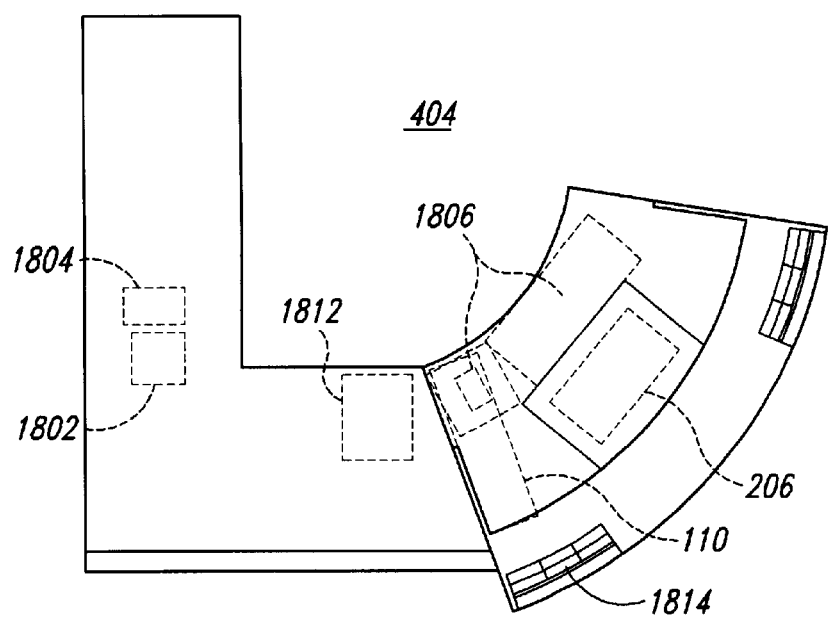
FIG. 19 is a top cut-away view of a concierge desk in a second alternate embodiment.

FIG. 19 is a top cut-away view of a concierge desk 404 in a second alternate embodiment. The concierge desk 404 of FIG. 19 is L-shaped on one end with a semi-circular arc connected to the short end of the L-shape. The semi-circular arc is approximately sixty (60) degrees in the depicted embodiment. The concierge could stand in the area formed between the arc and L-shape. The concierge desk 404 of FIG. 19 contains many of the same components as the concierge desk 404 described in relation to FIG. 18, and one skilled in the art will recognize that many different designs, materials, components, etc. are possible and within the scope of the invention.

Figure 20:
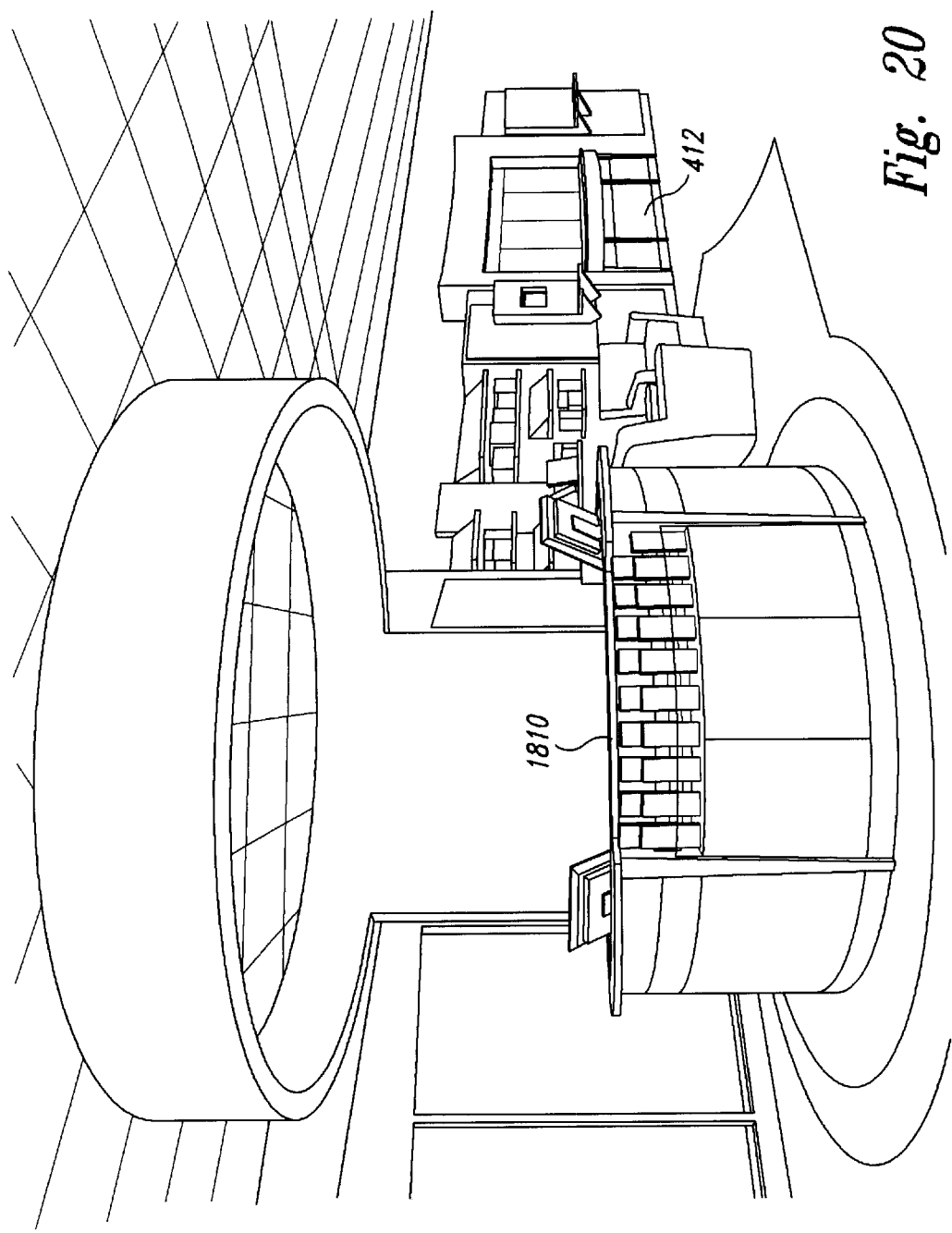
FIG. 20 is a photograph that is a side view of a concierge desk in a third alternative embodiment.

FIG. 20 is a photograph that is a side view of a concierge desk 404 in a third alternative embodiment. The concierge desk 404 of FIG. 20 is similar to the concierge desk of FIG. 18, and includes many of the same components, such as the tiered bins 1810 that hold informational brochures. A checking focal 412 can be seen in the background.

Figure 21:
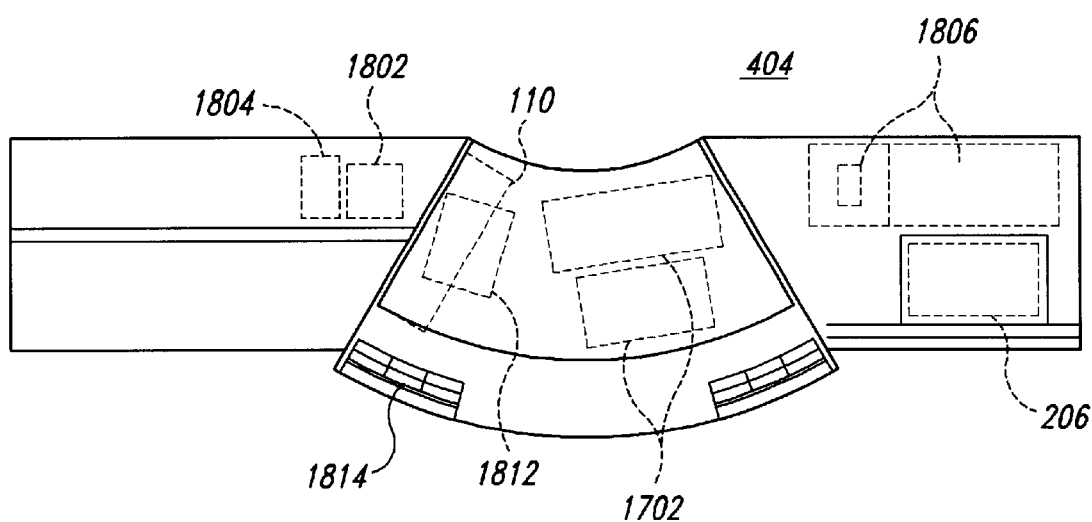
FIG. 21 is a top cut-away view of a concierge desk in a fourth alternate embodiment.

FIG. 21 is a top cut-away view of a concierge desk 404 in a fourth alternate embodiment. The concierge desk 404 of FIG. 21 includes a central curved section with straight sections extending outward from the center, resulting in a desk that is generally straight. The concierge could stand in the area formed behind the central curved section. The concierge desk 404 of FIG. 21 contains many of the same components as the concierge desk 404 described in relation to FIG. 18, such as a recessed flatscreen monitor 206, POS terminal 1702, PIN changer 1804, etc.

Figure 22:
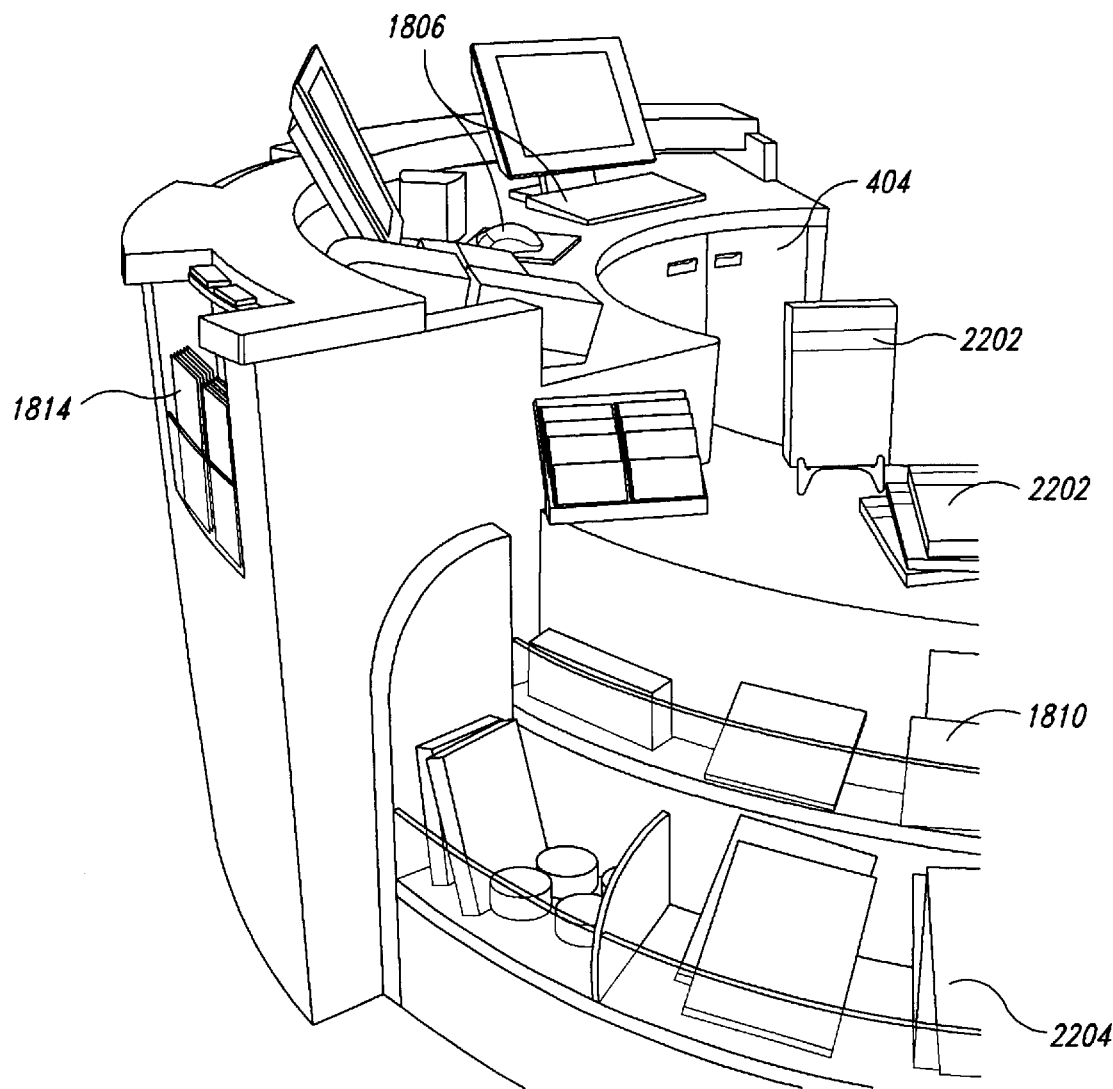
FIG. 22 is a photograph that is a side perspective view of a concierge desk in a fifth alternative embodiment.

FIG. 22 is a photograph that is a side perspective view of a concierge desk 404 in a fifth alternative embodiment. The concierge desk 404 of FIG. 22 is similar to the concierge desk of FIG. 18, and includes many of the same components, such as the tiered bins 1810 that hold informational brochures and the brochure pockets 1814. The concierge desk 404 also includes retails items such as books 2202, magazine 2204, and other products that may be sold by the concierge.

Figure 23:
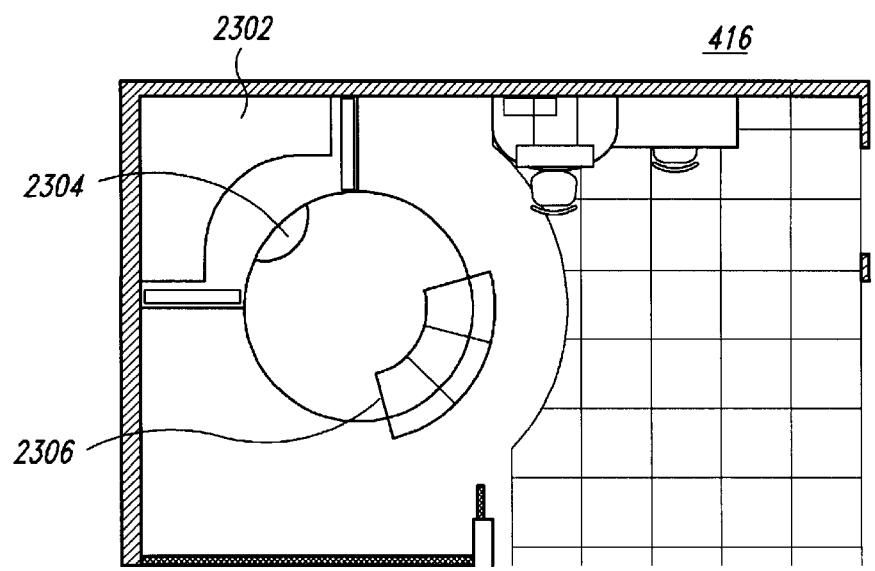
FIG. 23 is an overhead view of a kid's area in a branch bank in one embodiment.

FIG. 23 is an overhead view of a kid's area 416 in a branch bank in one embodiment. The kid's area 416 may include a television 2304 and seating 2306, which allow children to watch informational, educational, and/or financial-related videos and programming. The kid's area 416 may include a variety of toys or activities, such as a crawl tube 2302. The kid's area 416 projects a friendly, family image to customers, and makes it fun for children to visit the bank. If a parent needs to stay and consult with a bank employee, they know that there will be activities to keep their children entertained. The toys and activities are designed to be safe and easy to keep organized, and the colors used are bright and playful. The open design of the branch bank also allows parents to keep an eye on their children from almost anywhere in the branch bank. The kid's area 416 should be located with this in mind, as well as acoustic considerations.

Figure 24:
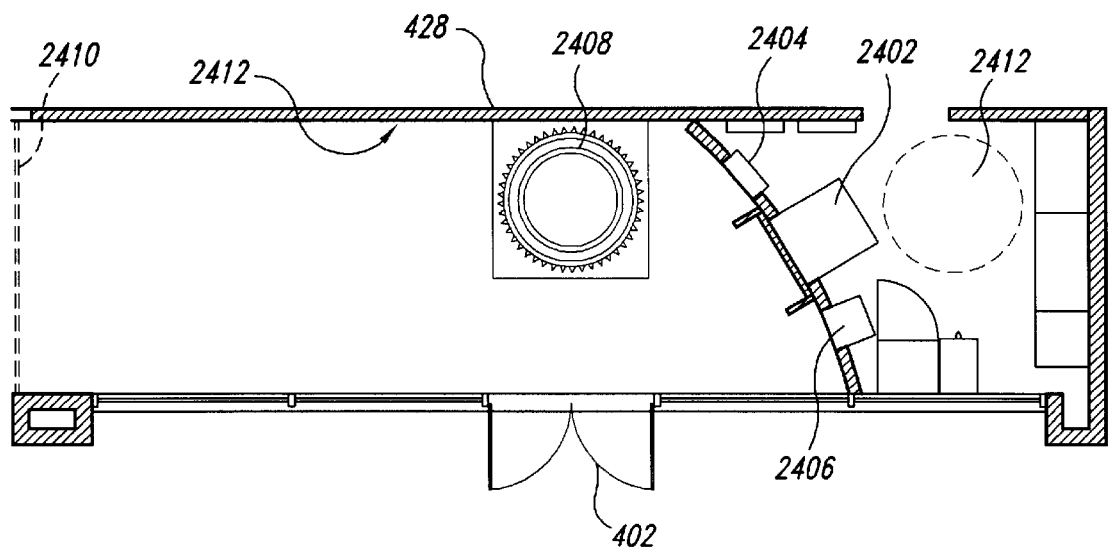
FIG. 24 is an overhead view of a vestibule in a branch bank in one embodiment.

FIG. 24 is an overhead view of a vestibule 428 in a branch bank in one embodiment. In the depicted embodiment, the vestibule 428 includes an ATM 2402, a phone banking center 2404, and an express deposit center 2406 on a wall near the entrance 402. The phone banking center 2404 provides 24-hour banking via a telephone line, and the express deposit center 2406 could be a letter drop, merchant bag drop, etc. After a customer walks through the entrance 402, a logo 2408 may be located on the ground nearby to provide either aesthetic value, advertising, or identification of the bank. A roll down security grill 2410 is located between the vestibule 428 and the main part of the branch bank. The vestibule directs or funnels traffic from the front door 402 to the concierge desk (not shown in FIG. 24). In the depicted embodiment, an ATM room 2412 is located behind the wall with the ATM 2402 to provide maintenance, service, and security access to the various pieces of equipment in the vestibule 428.

The vestibule 428 is designed to provide a positive first impression of the branch bank and to communicate a friendly message to the customer 24 hours a day. Appropriately, the vestibule 428 should be well lit, ventilated, and visible to the customer as they approach from the parking lot. Lights should remain on during the evening for security purposes, as well as to project a dynamic night time image to customers as they drive by. A story wall 2412 may include advertisements, decorations, etc. that are visible to the customer immediately upon entering the vestibule 428. An electronic card swipe at the entrance 402 can prevent unauthorized access to the bank, and security cameras, the card swipe, the roll down grill 2410, etc. provide security.

Figure 25:
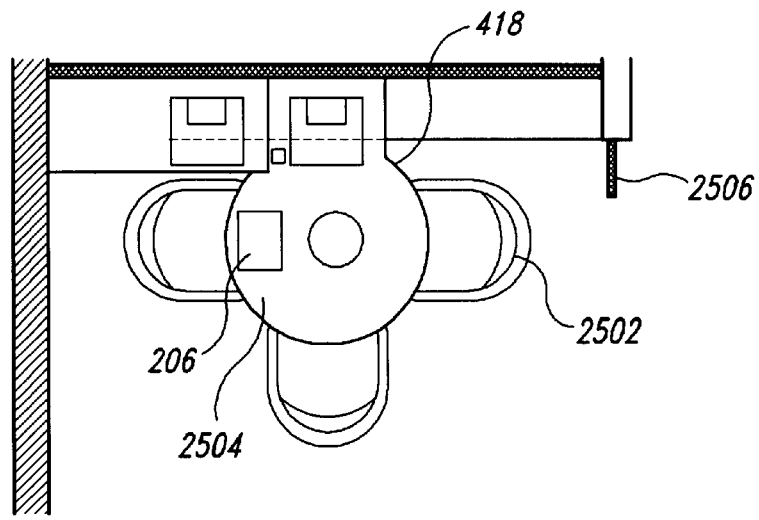
FIG. 25 is an overhead view of a consultation platform in a branch bank in one embodiment.

FIG. 25 is an overhead view of a consultation platform 418 in a branch bank in one embodiment. The consultation platform 418 includes a table 2504 and chairs 2502 to be used by bank employees and customers. The consultation platform 418 serves as a private desk for customers to discuss their accounts with bank employees. The bank employee may use a flatscreen monitor 206 to access teller computer 110 functions. The consultation platform 418 is intended to achieve a sense of privacy without using walls, such as by using glass wings 2506 and a lowered illuminated ceiling. Clutter on each desk should be kept to a minimum by either designing a discrete place for the clutter or moving it to a workroom that is out of sight to customers. The consultation platform 418 should be located near a workroom, which contains the printer and other necessary items and supplies.

Figure 26:
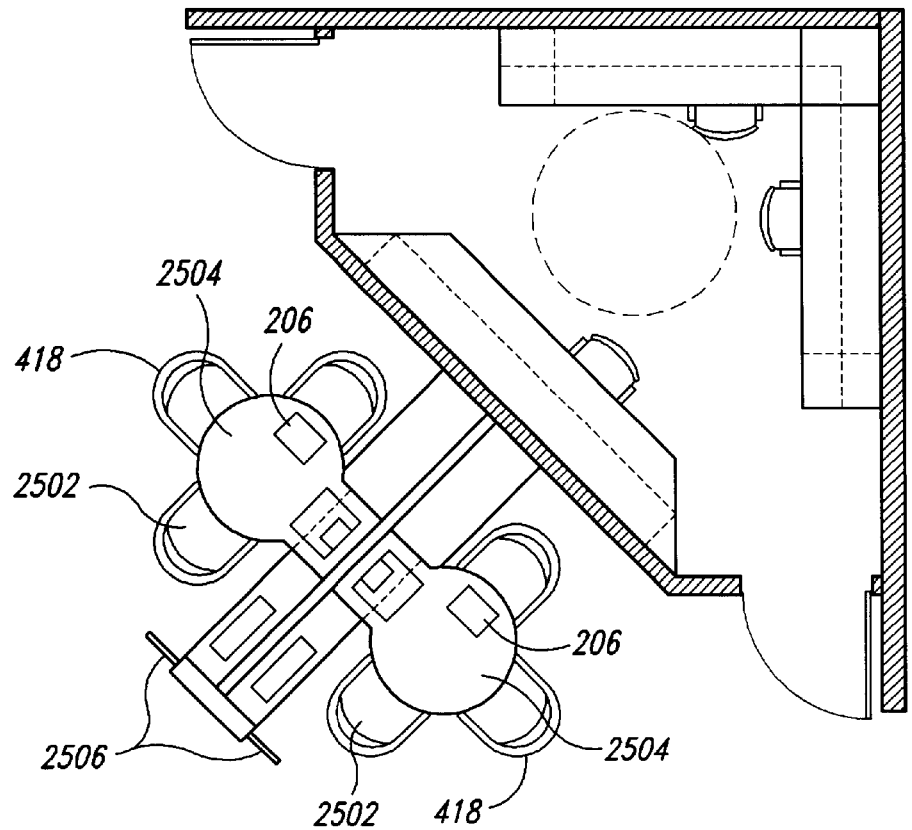
FIG. 26 is an overhead view of a pair of consultation platforms in a branch bank in one embodiment.

FIG. 26 is an overhead view of a pair of consultation platforms 418 in a branch bank in one embodiment. Each consultation platform 418 in the depicted embodiment is similar to the consultation platform described in relation to FIG. 21. In FIG. 26, it can be seen that consultation platforms 418 may be arranged in various fashions based on design constraints, aesthetic reasons, etc., and that more than one consultation platform 418 may be combined.

Figure 27:
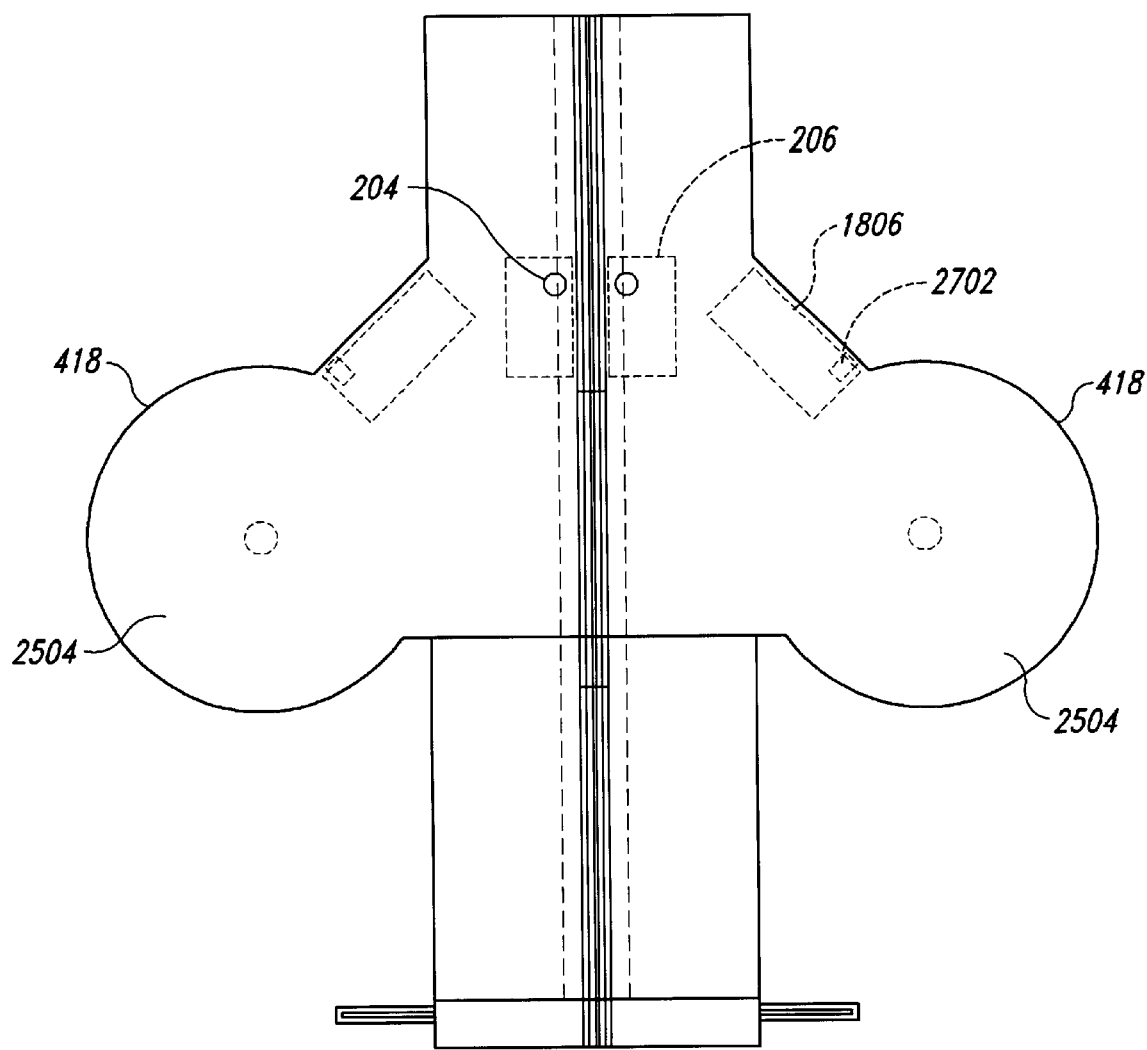
FIG. 27 is a cut-away overhead view of a pair of consultation platforms in a branch bank in one embodiment, similar to the consultation platforms described in relation to FIG. 23.

FIG. 27 is a cut-away overhead view of a pair of consultation platforms 418 in a branch bank in one embodiment, similar to the consultation platforms 418 described in relation to FIG. 23. Each consultation platform contains a flatscreen monitor 206 and user controls 1806 to provide access to a teller computer 110. Grommets 204 may be located in the top surface to allow passage of wires, cords, etc. An alarm 2702, such as a double-squeeze alarm, is located in an area easily accessible by a bank employee.

Figure 28:
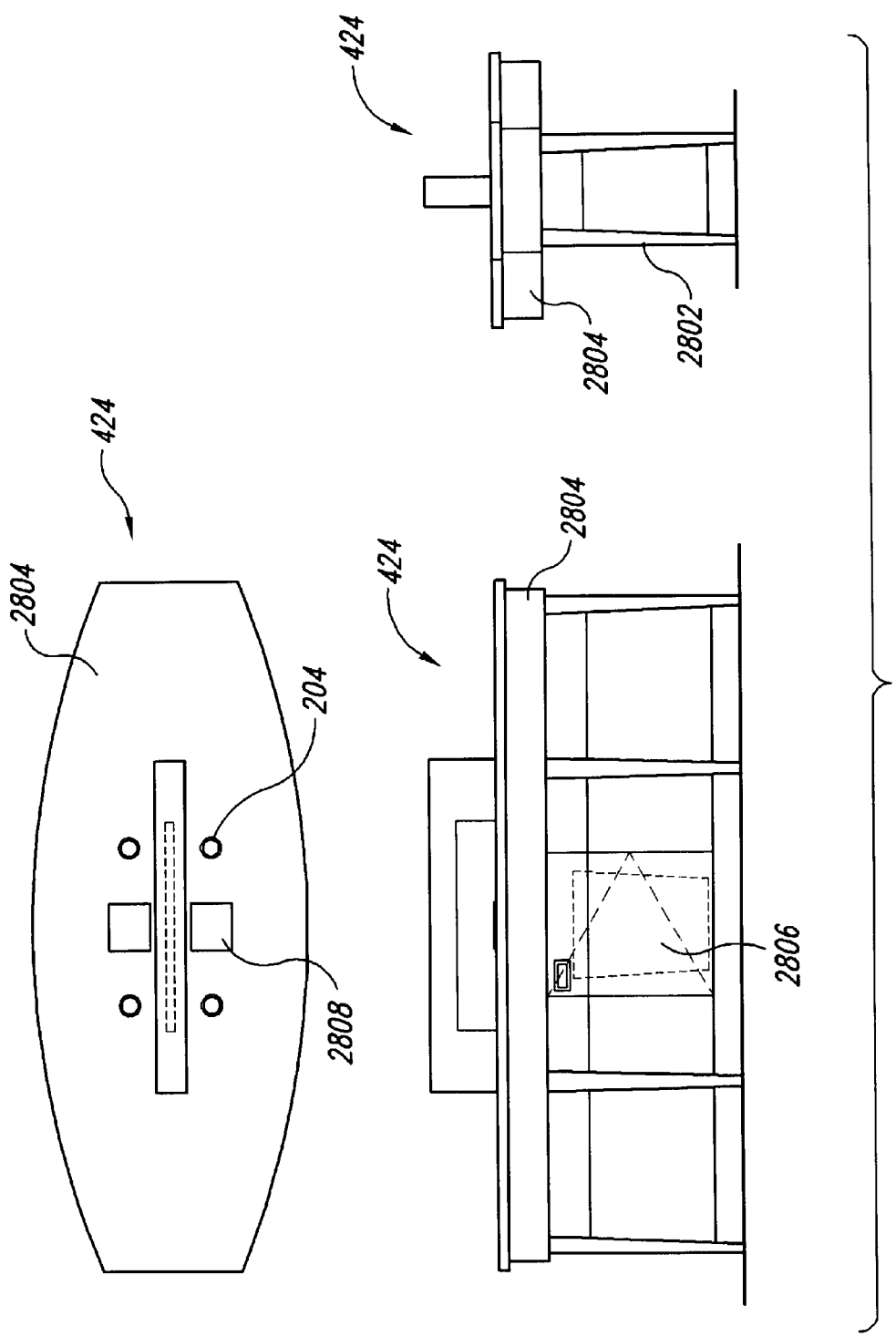
FIG. 28 is a cut-away overhead view of a check writing ledge in one embodiment.

FIG. 28 is a cut-away overhead view of a check writing ledge 424 in one embodiment. The check writing ledge 424 provides an area for customers to write, such as writing on checks or deposit slips, and to find materials, such as deposit slips, pens, withdrawal slips, etc. In the depicted embodiment, the check writing ledge 424 includes a top writing surface 2804 and a support 2802. Grommets 204 are located in the top writing surface 2804 to act as a conduit for wires and cords as well as a pen holder. A waste area 2808 provides access to a waste basket 2806 located inside the support 2802. The check writing ledge 424 should be strategically located so that customers have a natural flow into the branch bank. Many alternatives are possible for the check writing ledge 424, such as a round counter, a wall version, a half-circle version, a free-standing single or double counter, etc., and one skilled in the art will recognize that many alternatives are possible and within the scope of the invention.

Figure 29:
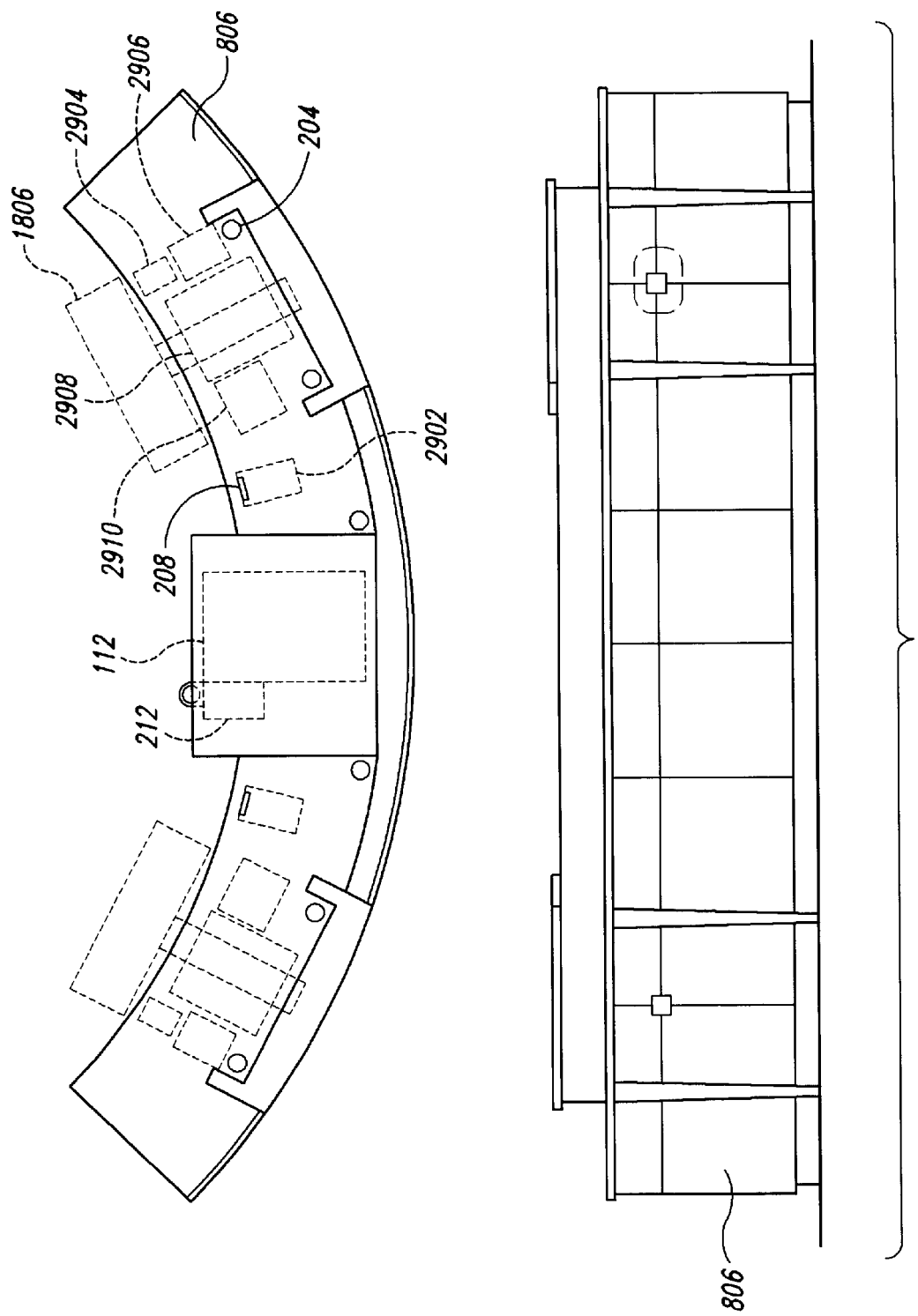
FIG. 29 is a cut-away overhead view of a teller counter in one embodiment.

FIG. 29 is a cut-away overhead view of a teller counter 806 in one embodiment. The teller counter 806 provides an area, similar to the teller towers 100, that allow for interaction between CRRs and customers and that also allows for many traditional teller functions to be performed. In one embodiment, the teller counter 806 is simply a modified teller tower 100 designed for multiple bank employees and/or customers. In the depicted embodiment, the teller counter 806 is roughly shaped in an arc of about one hundred fifty (150) degrees. The teller counter 806 includes a TCD 112 and coin dispenser 212. Each teller station of the teller counter 806 may include a printer 2910, monitor 2908, user controls 1806, check reader 2904, receipt printer 2906, deposit slot 208, grommets 204, and a cash box 2902, some of which are substantially similar to components of other parts of the branch bank. The check reader 2904 may be used to scan checks and a receipt printer 2906 may be used to print out receipts or other items. The cash box 2902 provides secure storage for items deposited through the deposit slots 208. The user controls 1806 may slide out from underneath the teller counter 806.

Figure 30:
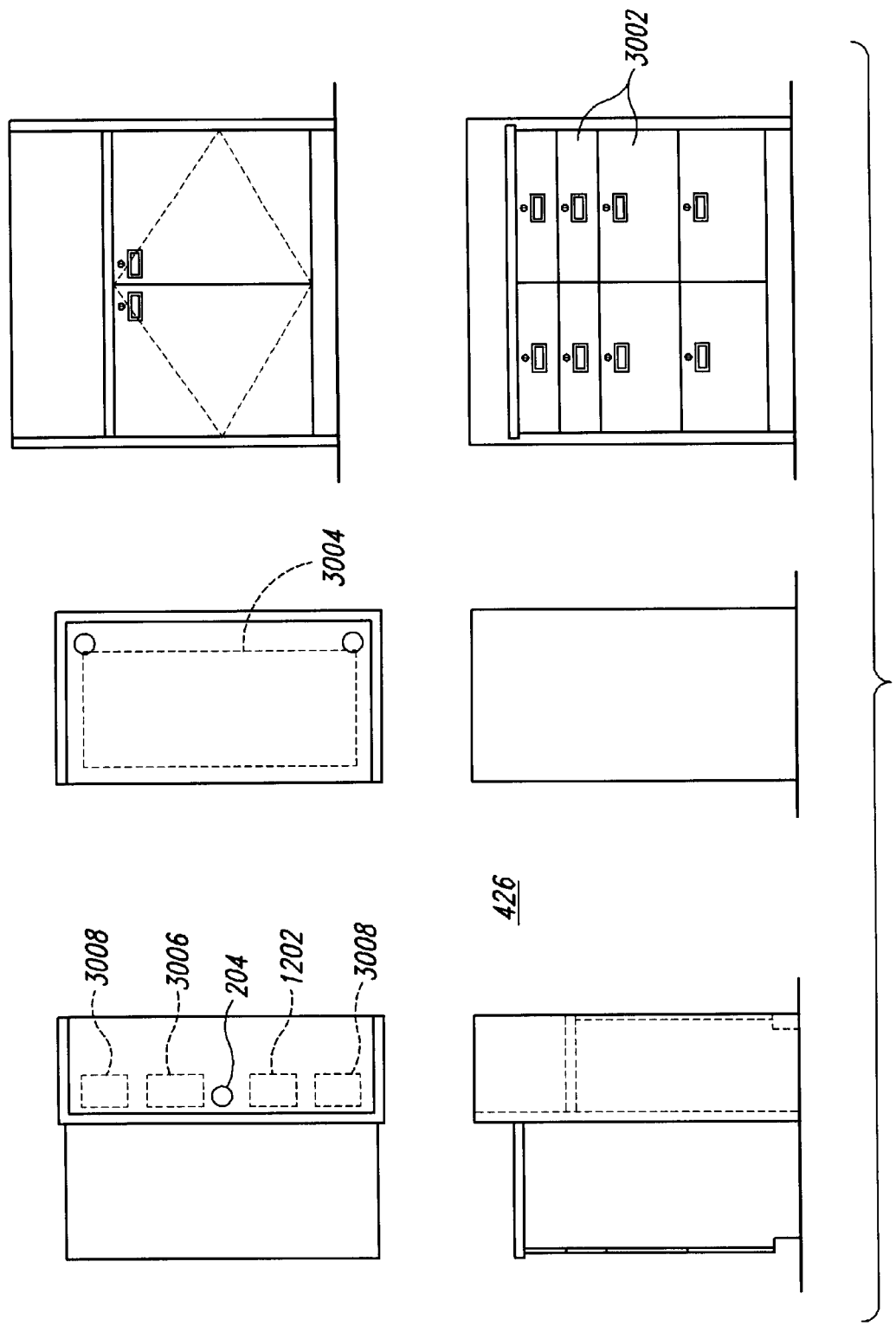
FIG. 30 is a cut-away overhead view of a teller back counter in one embodiment.

FIG. 30 is a cut-away overhead view of a teller back counter 426 in one embodiment. The teller back counter 426 is usually located near a group of teller towers 100 to provide printing and other generic capabilities to the teller tower 100 group. In the depicted embodiment, the teller back counter 426 includes a grommet 204, credit card verification machine 1802, telephones 3008, and a card imprinter 3006. The telephones 3008 provide communication abilities, particularly to managers or other persons in the branch bank. The imprinter 3006 assists in making receipts that include an imprint of a credit or debit card or with cashier's checks, money orders, etc. The teller back counter 426 may include a set of locked drawers 3002 that may be used to store supplies, blank forms, etc. The teller back counter 426 may also include a printer 3004, such as a Lexmark 1625 LAN printer or other suitable printer.

Figure 31:
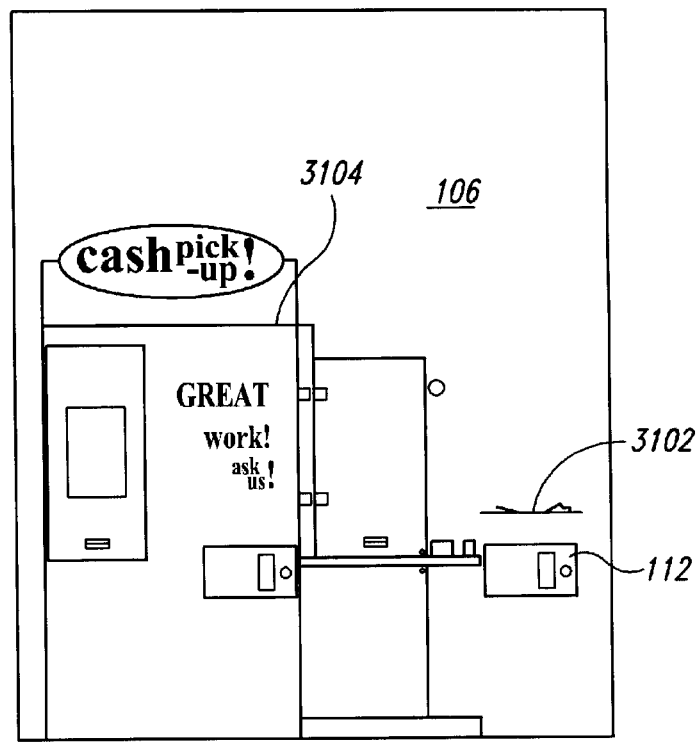
FIGS. 31 and 32 depict a cut-away front view of a wall TCD in one embodiment.
Figure 32:
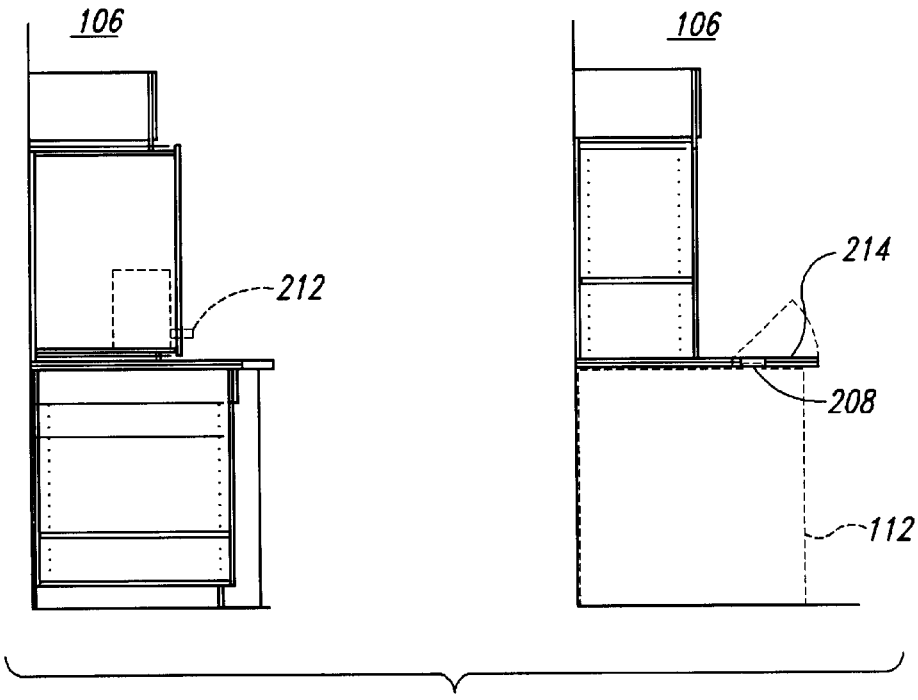

FIGS. 31 depicts a cut-away front view of a wall TCD 106 in one embodiment. The wall TCD 106 includes a TCD 112 that dispenses cash and a dispensation area 3102 that allows a customer to access the cash after it is dispensed. Advertising 3104 or other posters, placards, etc. may be located on the wall TCD 106. In alternative embodiment, a PIN keypad, card reader, receipt reader or other authorization device may be used to provide access to the TCD 112. FIG. 32 depicts a cut-away side view of a wall TCD 106 in one embodiment. A TCD 112 and cash dispenser 212 are located within the unit, and a cash dispensation area 214 provides access to the dispensed cash. Wall TCDs 106 and other TCDs are used to keep customers moving through the bank quickly and to minimize waiting. Customers will still go to teller towers 100 to conduct transactions, but any cash withdrawals will be dispensed at a remote location (e.g., wall TCD 106) on their way out of the bank, eliminating a step at the teller tower 100 and removing the liability of handling the cash for the bank employee. In one embodiment, one wall TCD 106 may be used for every four teller towers 100 instead of using a TCD 112 in each teller tower 100, saving costs. In one embodiment, the preferred location for a wall TCD 106 is near a personal loan focal 422. In one embodiment, a printer is included to print out a receipt summarizing any transaction performed on the wall TCD 106.

Figure 34:
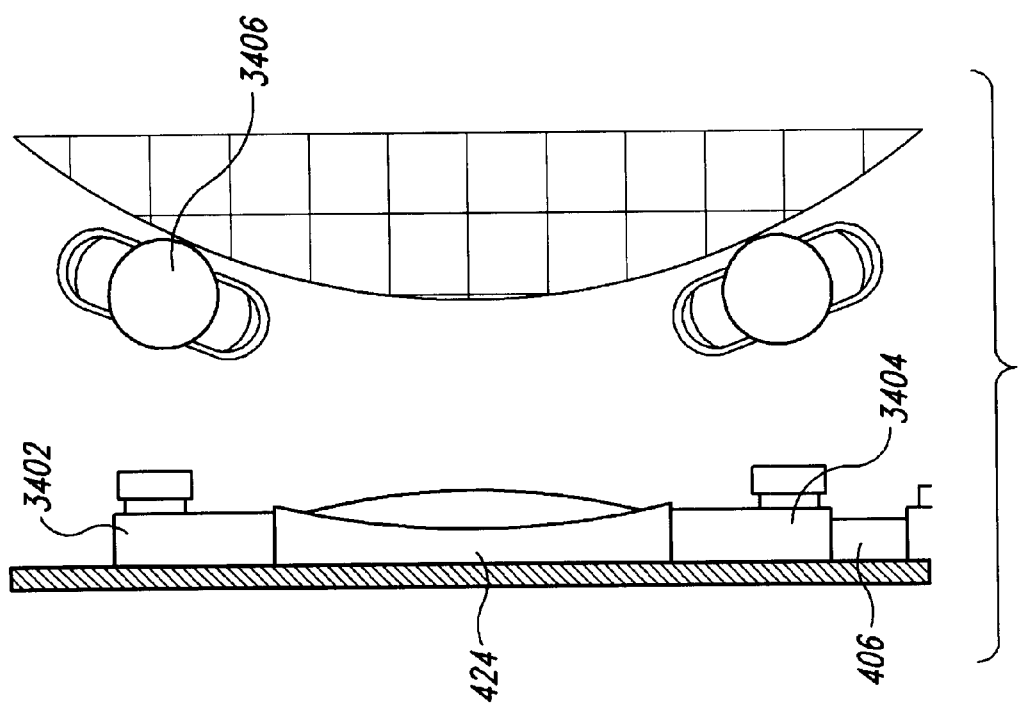
FIG. 34 is an overhead view of the checking focal in a branch bank in one embodiment.
Figure 33:
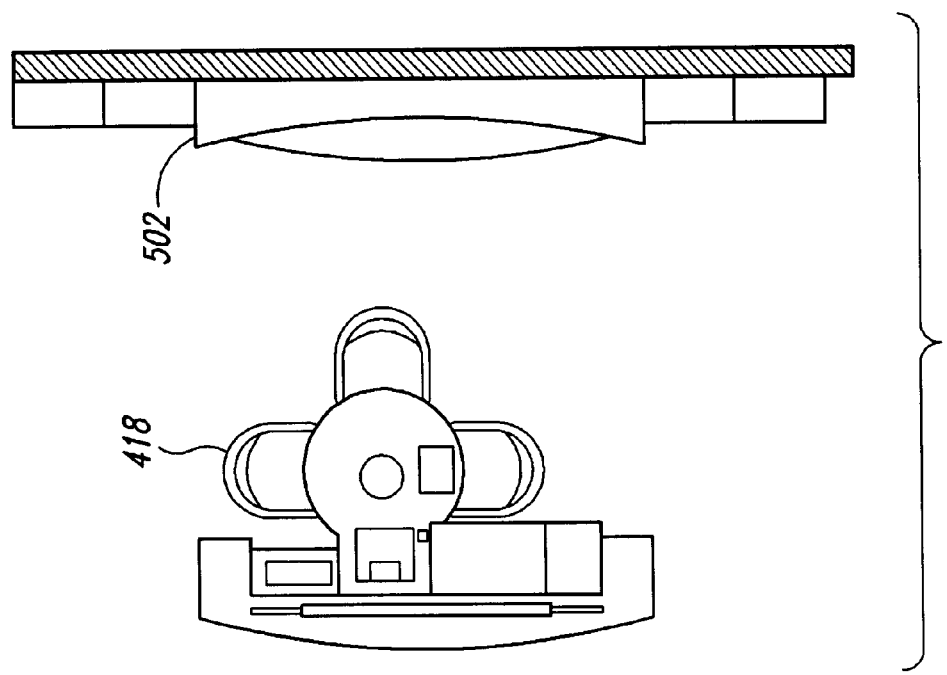
FIG. 33 is an overhead view of an investment focal in a branch bank in one embodiment.
Figure 35:
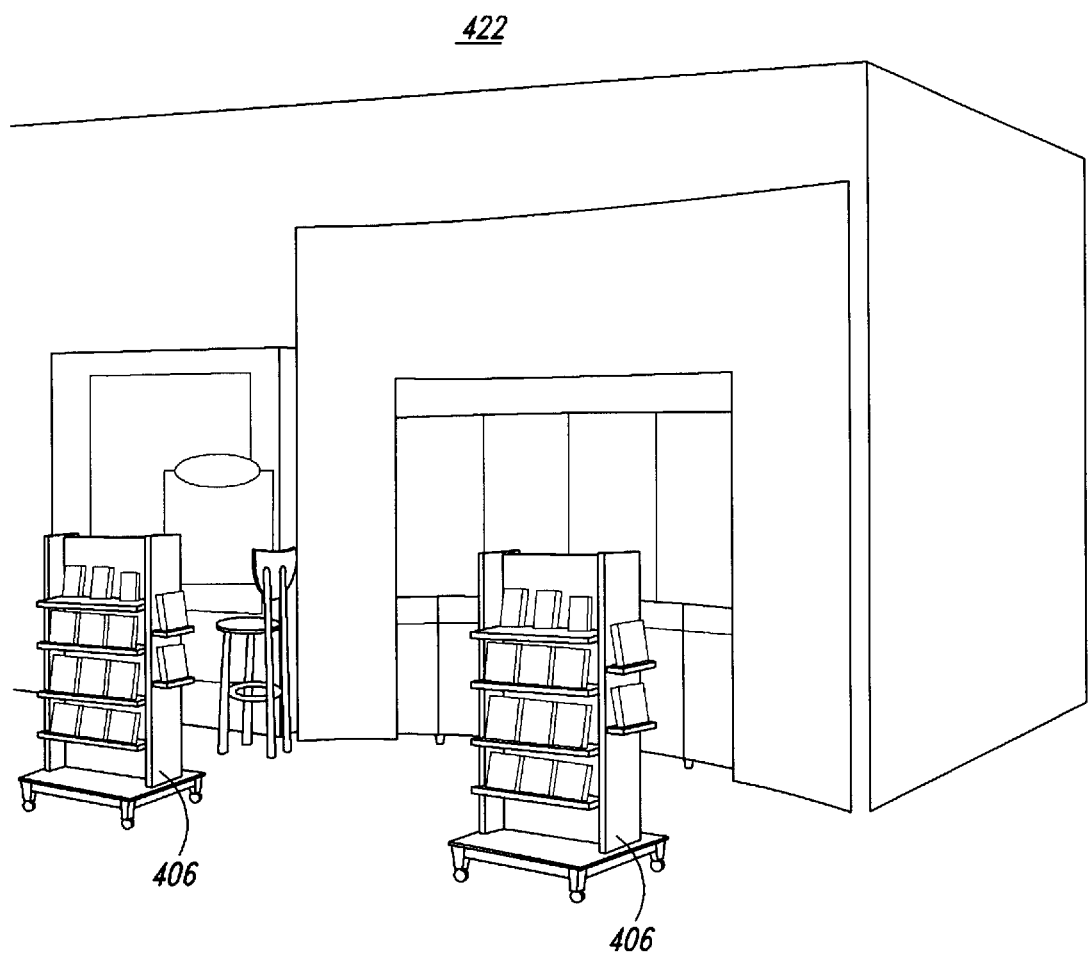
FIG. 35 is a side view of the personal loan focal in a branch bank in one embodiment.

FIGS. 33 through 35 depict various embodiments of product focals in a branch bank. FIG. 33 is an overhead view of an investment focal 502 in a branch bank in one embodiment. The investment focal 502 is located near at least one investment consultation platform 418 to assist in servicing customers. In one embodiment, there are five main types of product focals: checking, investment, personal loans, home loans, and financial services. Each product focal is intended to highlight the revenue generating products and services offered by the bank. Each product focal may also provide additional storage capacity. In one embodiment, the checking focal is located adjacent the retail area 406 and near the check counter and is the most prominent product focal in the branch bank. The personal loans focal is located on the opposite face of the vestibule story wall 2412, and the home loans focal is typically located on a perimeter wall opposite the personal loans focal. The product focals should be located in such a way as to be easily visible and accessible by customers throughout the bank.

FIG. 34 is an overhead view of the checking focal 424 in a branch bank in one embodiment. In the depicted embodiment, the checking focal 424 is located adjacent an interactive small business terminal 3402 and an on-line banking terminal 3404 (which provides an Internet connection), which may be similar in function to an Internet terminal 410. The interactive small business terminal 3402 is a common interactive terminal that can be used by customers to have questions answered, receive more information, etc. Customer tables 3406 are also located nearby the checking focal 424, and a retail area 406 is located nearby. FIG. 35 is a side view of the personal loan focal 422 in a branch bank in one embodiment. In the depicted embodiment, retails areas 406 are located nearby the personal loan focal 422.

One skilled in the art will recognize that a wide variety of branch bank designs are possible and within the scope of the invention. Possible variations in design include, but are not limited to, combinations of the elements and components described above, other components (e.g., different product focals, a games area, etc.), different numbers of teller towers 100, different configurations of teller towers 100 (e.g., diamond shape, random patterns, square shape, a long line, individual teller towers, etc.), different materials, and different building designs.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above", "below," and words of similar import, when used in this application, shall refer to this application as a whole and not to any particular portions of this application. Use of the term "or," as used in this application with respect to a list of two or more items, shall be interpreted to cover any, all, or any combination of items in the list.

The above detailed descriptions of embodiments of the invention are not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. The various embodiments described herein can be combined to provide further embodiments. These and other changes can be made to the invention in light of the detailed description.

All of the above references and U.S. patents and applications are incorporated herein by reference. Aspects of the invention can be modified, if necessary, to employ the systems, functions and concepts of the various patents and applications described above to provide yet further embodiments of the invention.

These and other changes can be made to the invention in light of the above detailed description. In general, the terms used in the following claims should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. For example, while only one aspect of the invention is recited as embodied in a method, other aspects may likewise be embodied in a method. Accordingly, the inventors reserve the right to add additional claims after filing the application to pursue such additional claim forms for other aspects of the invention.

We claim:

1. A financial transactions processing system to process financial transactions for a customer in a branch bank, the system comprising:

an entrance to the branch bank;

a concierge desk located near the entrance and within the branch bank to permit a live concierge to greet incoming branch bank customers;

three or more freestanding and spaced-apart teller podiums positioned at an approximate middle of a customer-accessible space within the branch bank, and spaced from the entrance to the branch bank, wherein the three or more teller Podiums are arranged in an approximately circular, semi-circular or oval arrangement, wherein each of the teller podiums is configured for live, personal interaction between the customer and a physically present bank teller, and includes a top surface, a customer interaction area, a teller computer operably connected with a bank server computer, one or more cash slots located in the top surface, and a cash box, wherein the customer interaction area faces outward from the circular, semi-circular or oval arrangement, and wherein the teller podium lacks a vertical window, wall or screen vertically and substantially separating the bank teller from the customer, wherein the cash box is adapted to securely hold cash that is deposited within it by the bank teller, and wherein further the cash slots are adapted to receive cash and direct the cash to the cash box, wherein the bank teller computer is configured for use by the bank teller and wherein at least a portion of the teller computer is positioned within, or received by, the teller podium to face the bank teller when the bank teller is interacting with the customer;

one or more product focals positioned along at least one wall and near to the teller podiums, wherein at least one product focal substantially fills a portion of the at least one wall and includes display information about a particular type of product offered by the branch bank and includes a fixture to provide brochures to customers regarding the product;

an automated teller cash dispenser positioned within the customer-accessible space within the branch bank and operably connected with the bank server computer, wherein the teller cash dispenser is adapted to receive information regarding a withdrawal transaction from the bank teller via the teller computer and to dispense cash to the customer; and one or more check writing ledges positioned near to the teller podiums in the customer-accessible space within the branch bank, or;

one or more teller back counters, the teller back counters being located near the teller podiums and within the branch bank.

2. The system of claim 1 further comprising one or more customer consultation platforms.

3. The system of claim 1 further comprising a kid's area.

4. The system of claim 1 wherein the teller cash dispenser is located in one or more of the teller podiums.

5. The system of claim 1 wherein the teller cash dispenser is a wall teller cash dispenser.

6. The system of claim 1 wherein the concierge and teller podiums are situated to encourage customers to go towards the teller podiums upon entering the branch bank.

7. The system of claim 1 further comprising means for directing the customer towards the teller podiums upon entering the branch bank.

8. The system of claim 1 wherein the teller podiums are arranged in a circle.

9. The system of claim 1 wherein the teller podiums are arranged in an elongated circle.

10. The system of claim 1 wherein the teller podiums are arranged in a semi-circle.

* * * * *